(12) United States Patent
George et al.

(10) Patent No.: US 11,977,448 B2
(45) Date of Patent: May 7, 2024

(54) DIRECTORY RESTORE FROM REMOTE OBJECT STORE

(71) Applicant: NetApp Inc., San Jose, CA (US)

(72) Inventors: Tijin George, Sunnyvale, CA (US); Avanthi Rajan, Fremont, CA (US); Sanhita Praveen Dhavale, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/824,131

(22) Filed: May 25, 2022

(65) Prior Publication Data
US 2023/0385153 A1    Nov. 30, 2023

(51) Int. Cl.
*G06F 11/00*    (2006.01)
*G06F 11/14*    (2006.01)
*G06F 16/11*    (2019.01)

(52) U.S. Cl.
CPC ...... *G06F 11/1435* (2013.01); *G06F 11/1469* (2013.01); *G06F 16/128* (2019.01); *G06F 2201/84* (2013.01)

(58) Field of Classification Search
CPC ............. G06F 11/1436; G06F 11/1469; G06F 16/128; G06F 2201/84
See application file for complete search history.

(56) References Cited

U.S. PATENT DOCUMENTS

| | | | |
|---|---|---|---|
| 6,795,966 B1 * | 9/2004 | Lim | G06F 11/1438 718/1 |
| 7,254,682 B1 * | 8/2007 | Arbon | G06F 11/1451 714/E11.123 |
| 7,478,101 B1 | 1/2009 | Manley | |
| 8,832,039 B1 * | 9/2014 | Sorenson, III | G06F 11/1448 707/746 |
| 9,430,330 B1 * | 8/2016 | Bardhan | G06F 11/1448 |
| 9,454,536 B1 * | 9/2016 | Rao | G06F 16/1724 |

(Continued)

FOREIGN PATENT DOCUMENTS

EP    3477481 A2    5/2019

OTHER PUBLICATIONS

Invitation to Pay Additional Fee for Application No. PCT/US2023/067333, dated Aug. 23, 2023, 17 pages.

(Continued)

*Primary Examiner* — Loan L. T. Truong
(74) *Attorney, Agent, or Firm* — Cooper Legal Group, LLC

(57) ABSTRACT

Techniques are provided for restoring a directory from a snapshot of a volume backed up to an object store. The snapshot may be backed up from a node to the object store, such as a cloud computing environment. A user may want to restore the directory within the volume without having to restore the entire volume, which otherwise would waste computing resources, storage, network bandwidth, and time. Accordingly, the techniques provided herein are capable of restoring just the directory from the snapshot that is stored within the object store. Because snapshot data of the snapshot may be stored across multiple objects within the object store, certain objects are identified as comprising snapshot data (backup data) of the directory and content items within the directory. In this way, the snapshot data of the directory is restored from these objects to a restore directory at a restore target.

20 Claims, 21 Drawing Sheets

(56) References Cited

U.S. PATENT DOCUMENTS

| | | | |
|---|---|---|---|
| 9,471,436 B2* | 10/2016 | Rash | G06F 11/1471 |
| 9,607,000 B1* | 3/2017 | Madhavapeddi | G06F 11/1456 |
| 10,852,976 B2 | 12/2020 | George et al. | |
| 10,853,182 B1* | 12/2020 | Vig | G06F 16/23 |
| 11,016,943 B2 | 5/2021 | George et al. | |
| 11,086,545 B1* | 8/2021 | Dayal | G06F 3/067 |
| 11,144,498 B2 | 10/2021 | George et al. | |
| 11,188,500 B2 | 11/2021 | Kushwah et al. | |
| 11,336,685 B1* | 5/2022 | Rodriguez | G06F 11/1464 |
| 2004/0254962 A1* | 12/2004 | Kodama | G06F 16/27 |
| 2008/0276239 A1* | 11/2008 | Collins | G06F 11/1471 718/101 |
| 2014/0081919 A1 | 3/2014 | Matsumoto et al. | |
| 2016/0055224 A1 | 2/2016 | Shetty et al. | |
| 2016/0170844 A1 | 6/2016 | Long et al. | |
| 2016/0342485 A1* | 11/2016 | McHugh | G06F 11/1471 |
| 2020/0183587 A1* | 6/2020 | Mak | G06F 3/064 |
| 2020/0285611 A1 | 9/2020 | George et al. | |
| 2020/0285613 A1 | 9/2020 | George et al. | |
| 2020/0285614 A1 | 9/2020 | George et al. | |
| 2021/0389883 A1* | 12/2021 | Derryberry | G06F 3/0659 |
| 2022/0179748 A1* | 6/2022 | Agarwal | G06F 11/1456 |
| 2022/0255826 A1* | 8/2022 | Chakankar | G06F 11/1464 |
| 2022/0414103 A1* | 12/2022 | Upadhyay | G06F 16/128 |
| 2023/0032522 A1* | 2/2023 | Nehra | G06F 11/1484 |
| 2023/0115489 A1* | 4/2023 | Devroy | G06F 11/1469 711/162 |
| 2023/0126234 A1* | 4/2023 | Dharmaprikar | G06F 11/1469 707/639 |
| 2023/0134314 A1* | 5/2023 | Braganza | H04L 67/10 707/609 |
| 2023/0147026 A1* | 5/2023 | Munshani | G06F 11/1435 714/15 |
| 2023/0168974 A1* | 6/2023 | Terazumi | G06F 11/1469 714/15 |
| 2023/0305619 A1* | 9/2023 | Tanna | G06F 1/3287 |

OTHER PUBLICATIONS

International Search Report and Written Opinion for Application No. PCT/US2023/067333, mailed on Oct. 17, 2023, 26 pages.

* cited by examiner

DIRECTORY RESTORE FROM REMOTE OBJECT STORE

BACKGROUND

A device such as a node may store data within a volume on behalf of a client. The volume may be stored within storage managed by the node, such as within on-prem storage. The node implements storage management functions for the client. For example, the node creates backups of the volume by creating snapshots of the volume. A snapshot of the volume captures a point-in-time representation of a state of the volume. The device uses the snapshot in order to restore the volume back to the state of the volume captured by the snapshot. Over time, a large number of snapshots can be created, which can consume a significant amount of storage. In order to more efficiently and cost effectively store these snapshots, the snapshots are backed up to an object store that provides low cost and long term scalable storage compared to the storage managed by the node.

DETAILED DESCRIPTION

Figure 1:
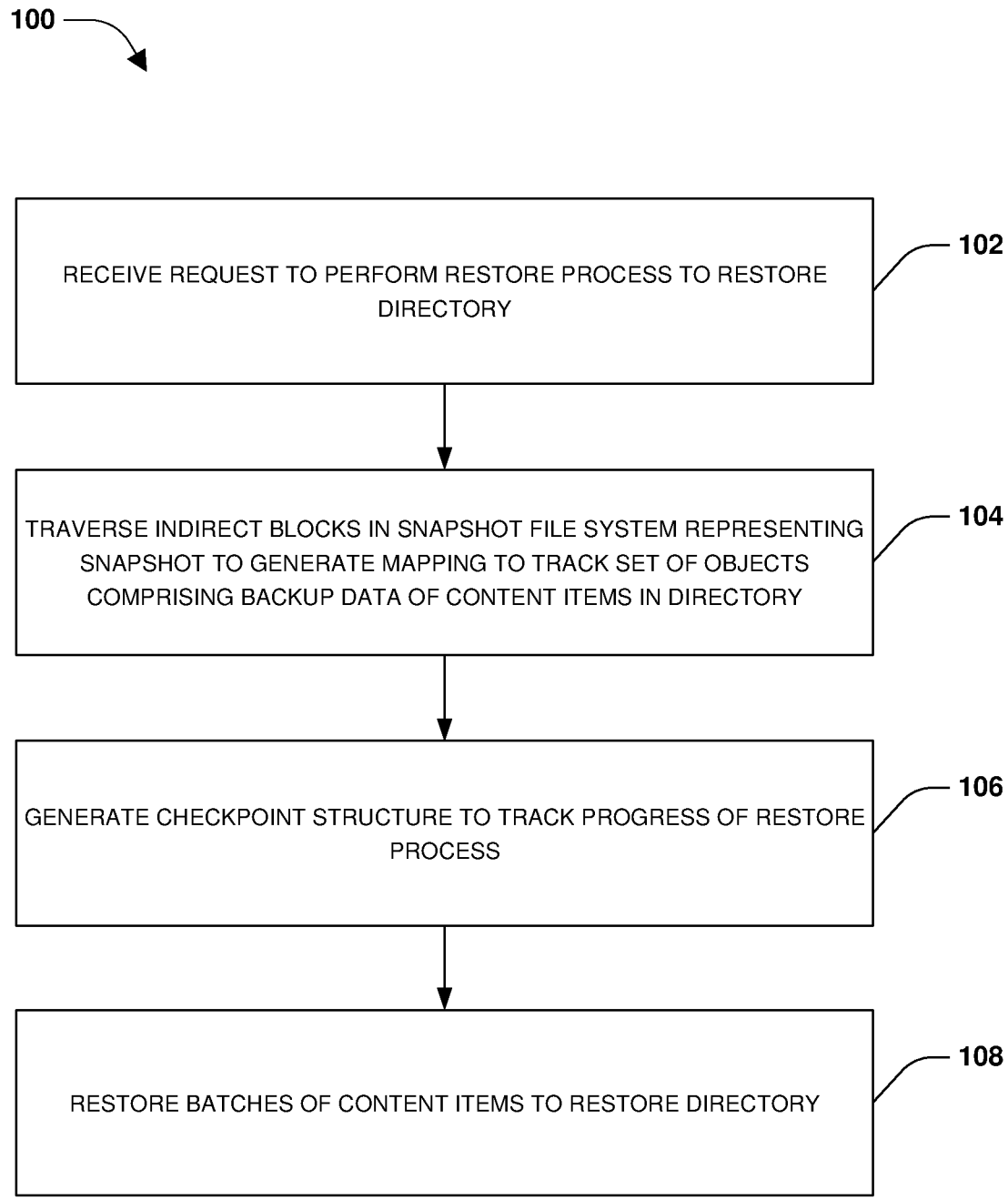
FIG. 1 is a flow chart illustrating an example method for restoring a directory using a snapshot backed up to an object store in accordance with various embodiments of the present technology.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A storage system such as a node provides a client with storage functionality, such as the ability to store data within a volume that is stored within storage managed by the storage system. The storage system provides backup and restore functionality for the volume. For example, the storage system backs up the volume by generating snapshots of the volume as point-in-time representations of the volume. These snapshots can be used to restore the volume to a state captured by a particular snapshot. An object store, such as a remote object store hosted by a cloud service provider, provides more cost effective and scalable storage compared to the storage managed by the storage system. Accordingly, the storage system is configured to back up the snapshots to the object store for low cost, scalable, and long term storage.

In some embodiments, the object store is a storage environment of a cloud computing environment hosted by a $3^{rd}$ party cloud storage provider (e.g., AWS, Azure, etc.). The storage environment comprises storage buckets within which objects are stored. These objects are created by the node to comprise snapshot data of snapshots being backed up to the storage environment. The node transmits these objects to an endpoint of the remote object store for storage within that endpoint (e.g., within a storage bucket of the endpoint). The storage environment is comprised of storage devices hosted and maintained by the $3^{rd}$ party cloud storage provider. The storage environment is accessible to client devices, such as the node, over a network. An endpoint of the storage environment has a frontend with which the client devices interact. The frontend is configured to receive API calls transmitted by the node to the storage environment. The API calls correspond to various processing and functionality that the node is requesting from the storage environment to perform, such as storing objects within the storage environment. In this way, the $3^{rd}$ party cloud storage provider provides the node with storage through storage buckets of the storage environment as the remote object store accessible through API calls transmitted over a network from client devices to the frontend of the storage environment. The $3^{rd}$ party cloud storage provider also provides compute, such as processor and memory resource, which is assigned to clients for use in hosting applications, websites, and services within virtual machines, containers, etc.

In order to back up the snapshots to the object store, the storage system stores snapshot data of the snapshots into objects. These objects are formatted according to an object format, which will be subsequently described in further detail in relation to FIG. 8C. The snapshot data referenced by the snapshot are stored across multiple objects, and multiple snapshots reference snapshot data within a single object. Additionally, a snapshot is represented by a snapshot file system that organizes content items (e.g., files, directories, etc.) of the snapshot according to a hierarchical structure, which will be subsequently described in further detail in relation to FIG. 8B.

Because of these complexities, restoring the volume using a snapshot whose snapshot data could be stored across multiple objects in the object store is non-trivial and complex. For example, the storage system must implement functionality and data structures used to track and identify which objects comprise snapshot data of the snapshot. The storage system issues API calls to the object store in order to retrieve the snapshot data from these particular objects. The snapshot data is then used by the storage system to reconstruct the volume back to the prior state captured by the snapshot.

A client of the storage system may want to restore less than the entire volume, such as to restore a directory of the volume as a restore directory at a restore target of the storage system. Unfortunately, there is no ability to efficiently restore merely the directory of the volume from a snapshot backed up to the object store as objects. One conventional technique for restoring the directory is to restore the entire volume from the snapshot. This is inefficient, time consuming, non-performant, and wastes a lot of resources because the entire volume is being restored over a network from the object store to the storage system. These inefficiencies are because the client may want to restore the directory having a small number of content items (e.g., 900 files), but the entire volume (e.g., 10 million file) must be restored in its entirety. Another conventional technique for restoring the directory is to implement an orchestrator that iteratively calls single file restore functions to individually restore each content item of the directory to the restore directory. However, a single file restore job will be created and executed for each content item of the directory (e.g., 900 individual single file restore jobs will be created and executed for the 900 files within the directory). Unfortunately, each individual single file restore job is a full fledge job and most of the overhead and time to implement a single file restore job relates to setting up the single file restore job, establishing a restore relationship, and/or other operations beyond the actual transferring/restoring of a file. This approach is very time consuming, even for small directories. For example, if the restoration of 8 files using individual single file restore jobs takes 1 minute, then restoring 100 k files could take 8 days.

Accordingly, as provided herein, a restore process is implemented to efficiently restore a directory from a snapshot backed up to an object store in order to create a restore directory at a restore target. The restore process is capable of merely restoring the content items of the directory without restoring the entire volume captured by the snapshot. Additionally, the restore process is capable of quickly restoring the directory without the time and overhead associated with conventional techniques that perform individual single file restore jobs for each content item within the directory.

In some embodiments of performing the restore process, a request to restore the directory is received. The request is received from a user, such as through a command line interface or a representational state transfer (REST) application programming interface (API). The request includes a directory inode number that is an identifier of the directory. The directory inode number corresponds to an inode that describes the directory. The request triggers a control workflow that implements a restore scanner. The restore scanner orchestrates the restoration of the directory and content items within the directory, such as files and subdirectories of the directory. The control workflow controls the restore scanner to execute a cloud directory iterator. The cloud directory iterator iterates and lists information the content items of the directory backed up to the object store. The cloud directory iterator also returns a checkpoint structure, such as a cookie. The checkpoint structure contains information about progress of the restore process, such as an indication of which content items of the directory that have been successfully iterated so far. In this way, the checkpoint structure is used to track the progress of the restore process, thus is used to restart the restore process from where the restore process left off such as in the event of a failure.

The cloud directory iterator utilizes object store snapshot difference functionality and object store snapshot read functionality as part of restoring the directory. This functionality is used to identify and retrieve directory blocks of the directory from the objects storing the snapshot data (backup data) of the directory in the object store. The directory blocks contain directory entries of the content items within the directory. In this way, the cloud directory iterator identifies and lists this information about the content items within the directory to restore from the snapshot whose snapshot data is backed up into objects stored in the object store.

The control workflow controls the restore scanner to execute a file system restore scanner. The file system restore scanner uses the information listed by the cloud directory iterator as input, such as the directory entries of the content items within the directory to restore. As part of restoring the content items of the directory, batches of the content items are restored until all content items have been restored to the restore directory. For a batch of the content items, the file system restore scanner uses the information about these content items to locate the objects in the object store comprising snapshot data (backup data) of these content items. The file system restore scanner restores these content items to the restore directory. For example, the file system restore scanner uses single file restore functionality to restore the content items using the snapshot data (backup data) in the objects stored in the object store. This process of executing the cloud directory iterator to identify information about a batch of content items, and then executing the file system restore scanner to use this information to restore the content items from the object store to the restore directory may be iteratively performed for each batch of content items. In this way, the batches of content items are iteratively restored until the directory and all content items within the directory are restored from the object store to the restore directory.

Various embodiments of the present technology provide for a wide range of technical effects, advantages, and/or improvements to computing systems and components. For example, various embodiments may include one or more of the following technical effects, advantages, and/or improvements: 1) the use of non-routine and unconventional operations to restore a directory from a snapshot of a volume without restoring the entire contents of the volume in order to conserve storage space, time, resource consumption, and bandwidth otherwise wasted in restoring the entire volume; 2) the use of non-routine and unconventional operations to restore a directory from a snapshot whose snapshot data is stored across one or more objects within a remote object store such as a cloud computing environment; 3) the use of non-routine and unconventional operations to efficiently restore batches of content items of a directory without individually restoring each content item using separate single file restore jobs for each content item, 4) improving security by restoring access control lists (ALCs) and/or streams for the directory before performing the restore process to ensure there is no unauthorized access to the directory being restored; and/or 5) the use of non-routine and unconventional operations to track progress of the restore process using a checkpoint structure in order to restart the restore process from a point at which the restore process left off such as after a failure.

Figure 2A:
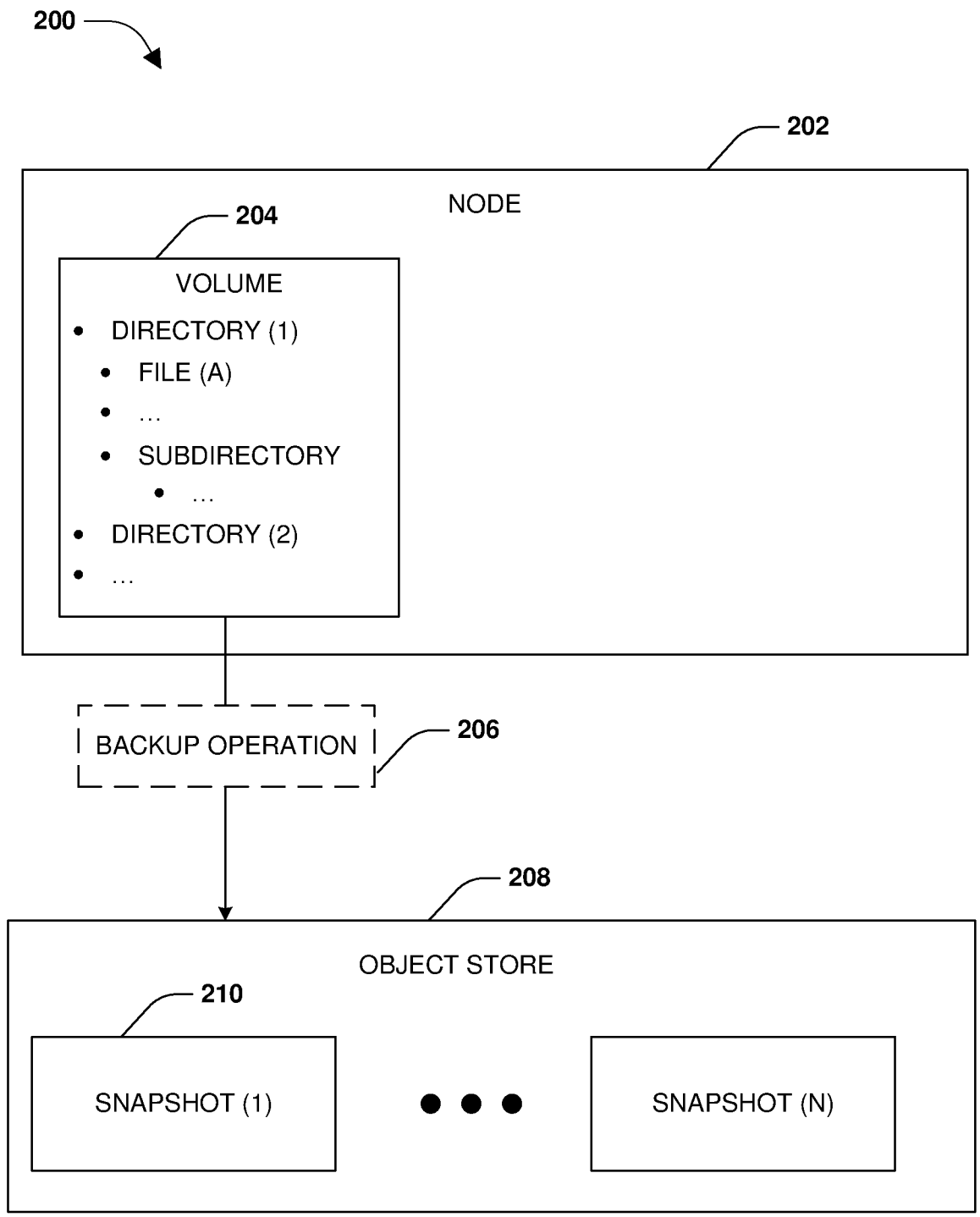
FIG. 2A is a block diagram illustrating an example system restoring a directory using a snapshot backed up to an object store in accordance with various embodiments of the present technology, where a backup operation is implemented.

One embodiment of restoring a directory from a snapshot in an object store is illustrated by an exemplary method 100 of FIG. 1, which is further described in conjunction with system 200 of FIGS. 2A-2E. A storage system may be implemented as a node 202, such as a server, a container hosted within a container orchestration platform such as Kubernetes, a serverless thread, hardware, software, or combinations thereof. The node 202 stores data on behalf of clients, such as within a volume 204, as illustrated by FIG. 2A. The volume 204 is stored within on-prem storage or some other storage managed by the node 202. The volume 204 comprises data organized according to a hierarchical structure of a file system. For example, the volume 204 comprises one or more content items such as a first directory, a second directory, and/or other directories or content items (e.g., files, subdirectories, etc.). The first directory comprises one or more content items, such as a file (A), a subdirectory, and/or content items. In order to provide redundancy and data protection, the node 202 generates snapshots of the volume 204 as point-in-time representations of the volume 204. A snapshot can be used to restore the volume 204 back to a point-in-time captured by the snapshot.

Because storage managed by the node 202 such as on-prem storage may be relatively expensive and does not efficiently scale for long term backup storage, the node 202 backs up the snapshots to an object store 208, such as a remote object store managed by a $3^{rd}$ cloud storage provider and accessible to the node 202 over a network. In an embodiment, the node 202 implements a backup operation 206 to back up a first snapshot 210 of the volume 204 to the object store 208. The object store 208 may be configured to store objects. In order to back up the first snapshot 210 to the object store 208, the node 202 creates objects comprising snapshot data of the first snapshot 210. These objects are formatted according to an object format, which will be subsequently described in further detail in relation to FIG. 8C. Because snapshots are incrementally backed up to the object store 208, the node 202 creates new objects comprising snapshot data of the first snapshot 210 not already backed up to the object store 208. Also, the first snapshot 210 may reference shared snapshot data of objects already backed up to the object store 208 and referenced by other snapshots. The first snapshot 210 is represented by a snapshot file system 220 that organizes content items (e.g., files, directories, etc.) of the first snapshot 210 according to a hierarchical structure, which will be subsequently described in further detail in relation to FIG. 8B. In this way, the node 202 backs up snapshot data of snapshots of the volume 204 into objects stored within the object store 208.

Figure 2B:
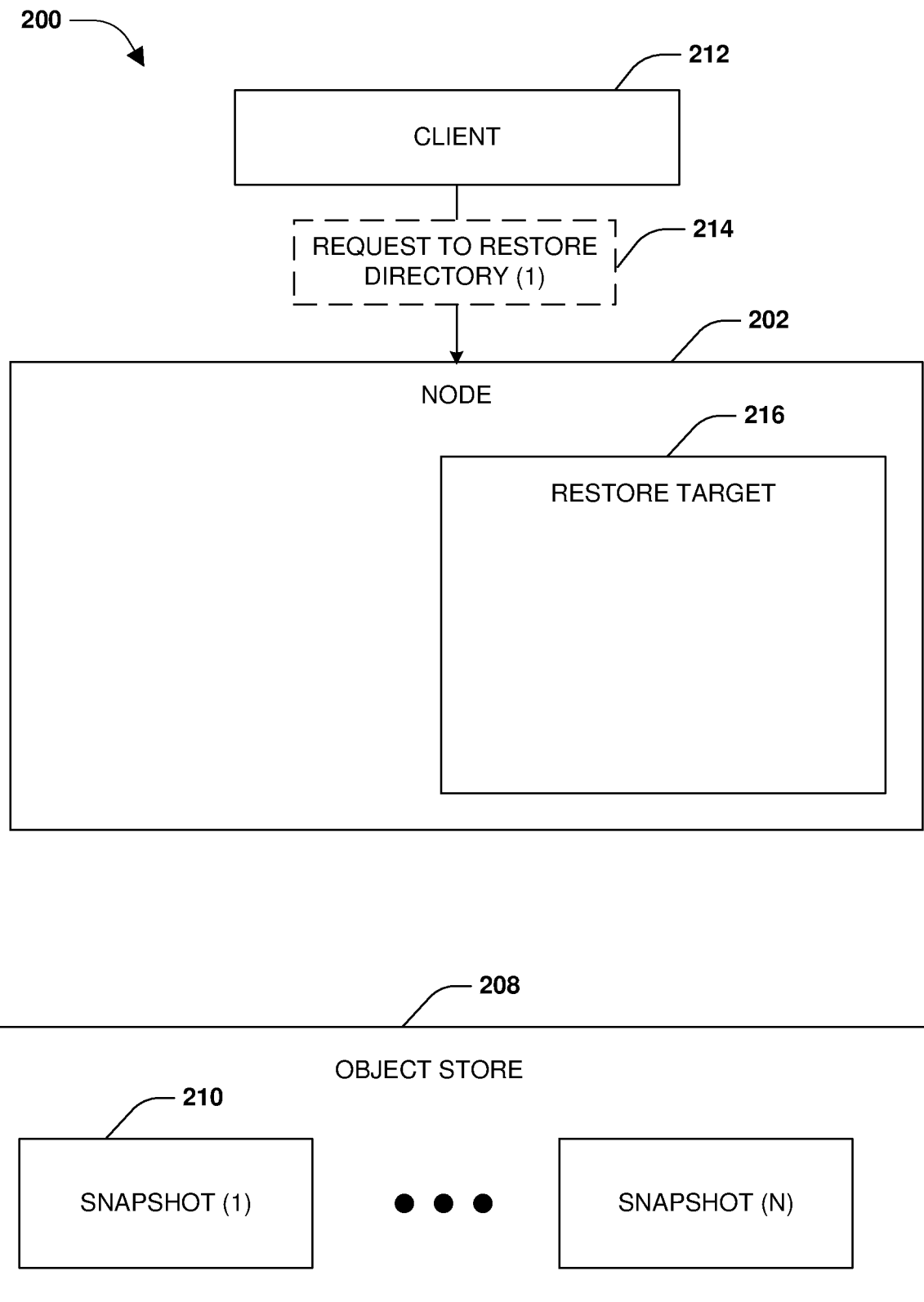
FIG. 2B is a block diagram illustrating an example system restoring a directory using a snapshot backed up to an object store in accordance with various embodiments of the present technology, where a request to restore the directory is received.

During operation 102 of method 100, the node 202 receives a request 214 from a client 212 to restore the first directory to a point-in-time representation of the first directory captured within the first snapshot 210 of the volume 204, as illustrated by FIG. 2B. The request 214 specifies a restore target 216 (e.g., a storage location) at which the first directory is to be restored as a restore directory 232. In some embodiments, the request 214 specifies a directory inode number of an inode describing the first directory. In some embodiments, the node 202 performs a preliminary check to determine whether the restore target 216 contains a current directory with the same name as the first directory that is to be restored. This preliminary check is performed to ensure that the restore process does not inadvertently overwrite the content of this current directory, such as where the request 214 to restore the first directory to the restore target 216 was issued my mistake or with errors. In response to detecting that the current directory with the same name as the first directory exists at the restore target 216, an alert is generated and transmitted to the client 212. The alert specifies that the current directory with the same name already exists, a suggestion to have the node 202 delete, rename, or move the current directory from the restore target 216, etc.

Figure 2C:
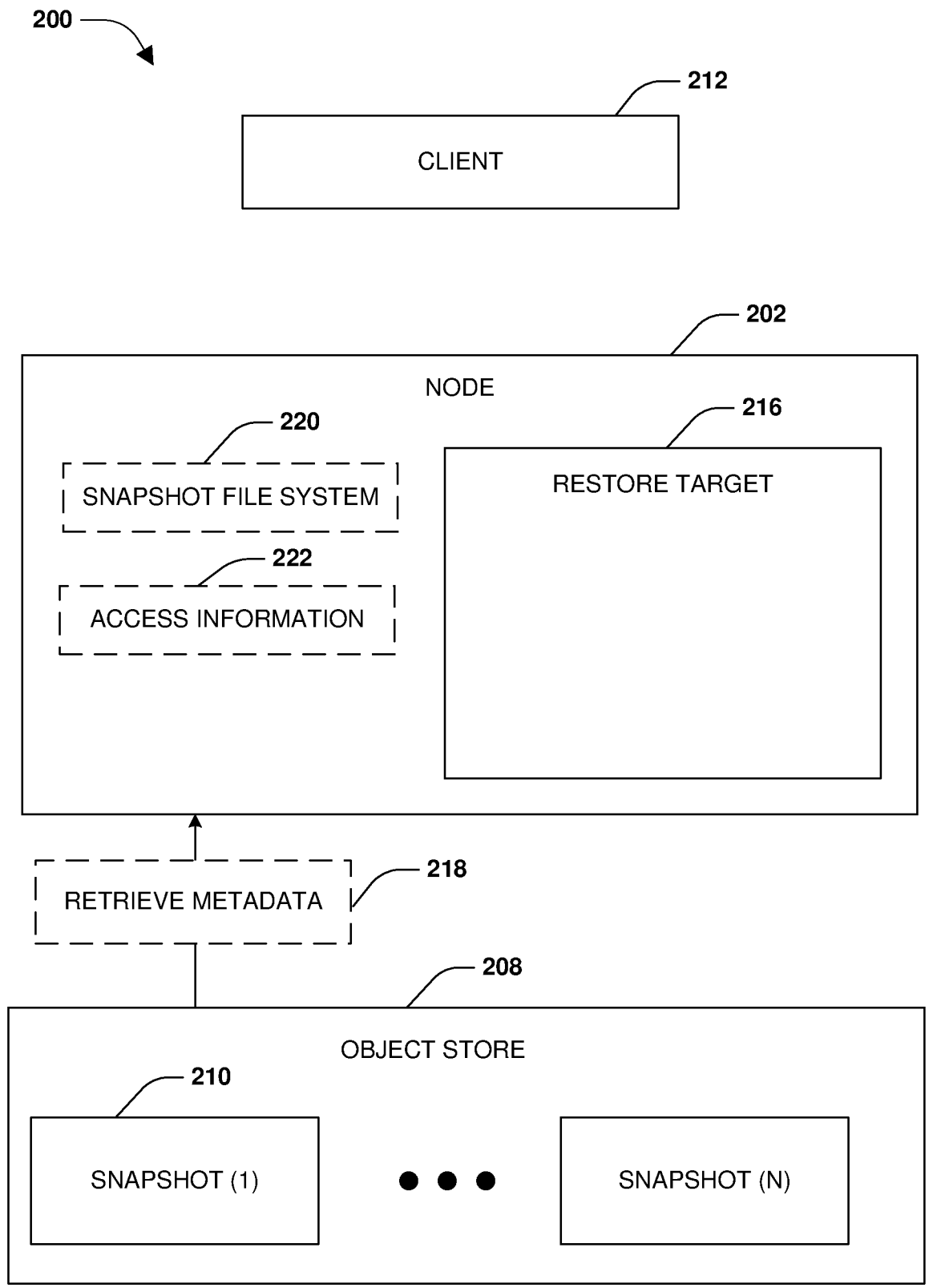
FIG. 2C is a block diagram illustrating an example system restoring a directory using a snapshot backed up to an object store in accordance with various embodiments of the present technology, where metadata associated with the snapshot is restored.

In some embodiments, before the restore process is performed, metadata 218 of the first snapshot 210 is retrieved, as illustrated by FIG. 2C. The metadata 218 comprises the snapshot file system 220 used to identify content items (files and directories) captured by the first snapshot. An embodiment of the snapshot file system 220 is illustrated by and further described in relation to FIG. 8B.

In some embodiments, before the restore process is performed, the node 202 retrieves access information 222 for the first directory. The access information 222 is retrieved from the object store 208, such as from the first snapshot 210 or from the metadata associated with the first snapshot 210. The access information 222 is used to determine who has access and what type of access to the first directory. In some embodiments, the access information 222 comprises access control lists (ACLs). The access control lists may comprise rules and/or permissions for granting or denying access to the first directory and/or to content items within the first directory. The access control lists is applied to the restore directory 232 during the restore process in order to authenticate access requests to the restore directory 232 and restored content items within the restore directory 232 during the restore process so that there is no unauthorized access.

In some embodiments, the access information 222 comprises streams. In some embodiments where the volume 204 implements an NTFS file system or other type of file system, the streams contain data that is written to a file, which gives more information about the file beyond attributes and properties. For example, a stream is created to contain search keywords or an identity of a user account that created the file. From a user perspective, streams are as important as the user data, and thus these streams are restored before the restore process is performed. Also, a stream corresponds to a stream file that may be associated with a LUN, and carries information about the LUN. Before restoring the first directory that contains the LUN, this stream is restored. During the restore process, the streams is used to provide access to the restore directory 232 and restored items within the restore directory 232.

Figure 2D:
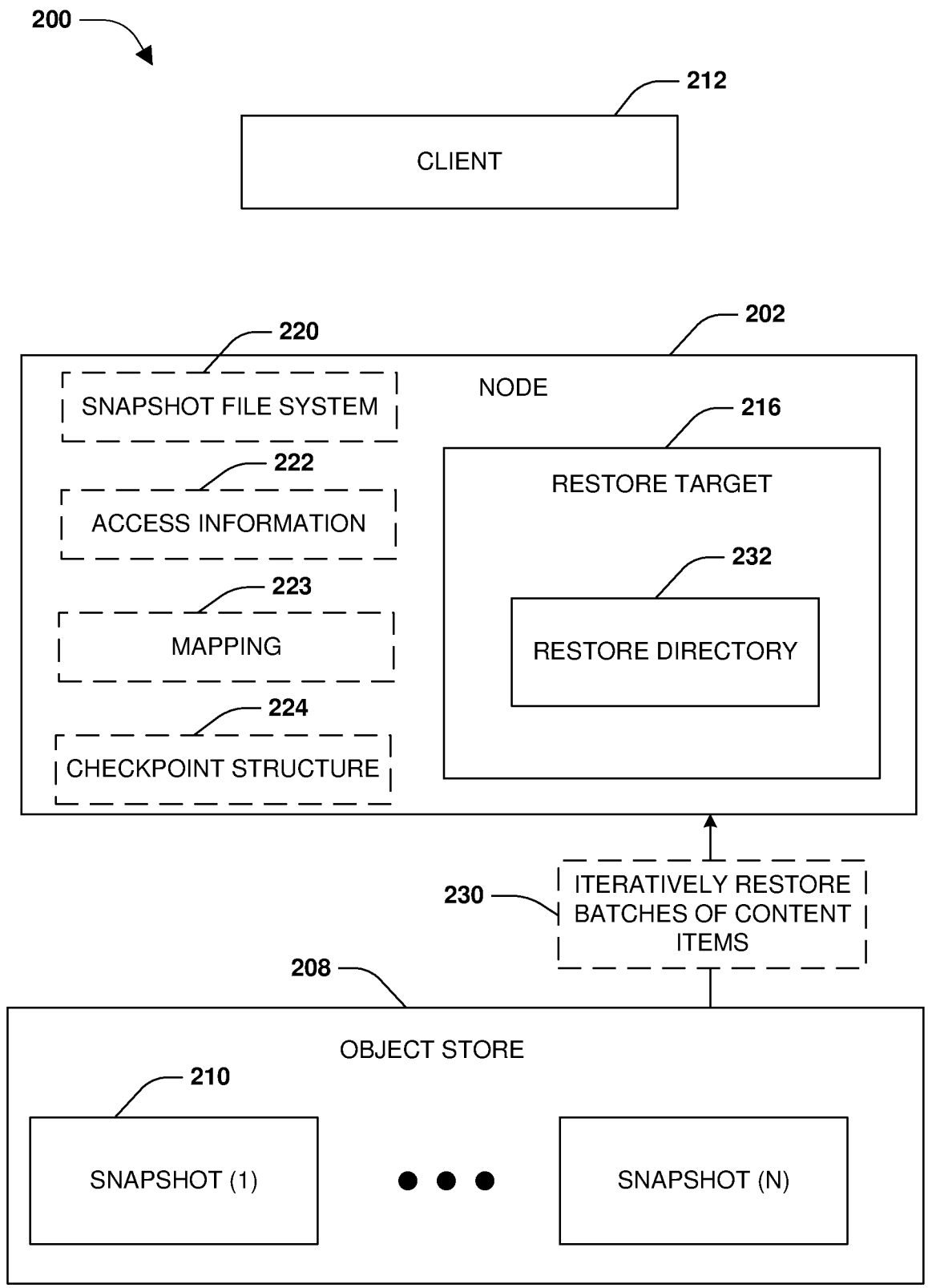
FIG. 2D is a block diagram illustrating an example system restoring a directory using a snapshot backed up to an object store in accordance with various embodiments of the present technology, where batches of content items within the directory are iteratively restored.

Once the access information 22 has been restored, the restore process is initiated to iteratively restore 230 batches of content items of the directory from the objects in the object store 208 to the restore directory 232, as illustrated by FIG. 2D. During the restore process, non-fenced access to the restore directory 232 is provided such that the client 212 may access the restore directory 232 without being blocked/restricted such as by a fence or other mechanism. Non-fenced access is also provided for already restored content items within the restore directory 232. That is, once a batch of content items are restored to the restore directory 232 as restored content items, the client 212 may access those restored content items. While a batch of content items are currently being restored by the restore process, a fence is set to block access to the content items (restored content items) until the entire batch of the content items have been successfully restored. This ensures that the client 212 does not access a partially restored content item not yet fully restored, which otherwise could result in corruption or other issues.

During operation 104 of method 100, indirect blocks within the snapshot file system 220 are traversed to generate a mapping 223 that tracks a set of objects comprising snapshot data of the content items in the first directory. That is, the directory inode number in the request 214 is used to traverse the snapshot file system 220 to identify objects comprising snapshot data, of the first snapshot 210, corresponding to backup data of the first directory and the content items in the first directory. This mapping 223 is used by the restore process to identify which objects within the object store 208 comprise the backup data (snapshot data of the first snapshot 210) of the first directory and of the content items in the first directory to restore.

During operation 106 of method 100, a checkpoint structure 224 is generated to track progress of the restore process. In some embodiments, the checkpoint structure 224 comprises a cookie used to store information regarding the progress of the restore process. In some embodiments, the checkpoint structure 224 is populated with information identifying a last batch of content items of the first directory that were successfully restored to the restore directory 232. Initially, the checkpoint structure 224 indicates that none of the content items of the first directory have been restored to the restore directory 232. As batch of content items are restored to the restore directory 232, the checkpoint structure 224 will be populated with an indication of a most recent batch of content items that were successfully restored. This can be used by the restore process to identify a next batch of content items to restore next. In the event the restore process experiences a failure, the checkpoint structure 224 can be used to restart the restore process from where the restore process left off. This is because the checkpoint structure 224 can be used to identify which content items have been successfully restored and which content items still need to be restored. If the restore process fails, a cleanup procedure is performed for the restore directory 232 and restored content items within the restore directory 232. The cleanup procedure may ask the user if the user wants to restart the restore process from where the restore process left off, whether the restore process should not be restarted and the restore directory 232 should be deleted, etc.

Once the restore process has restored and applied the access information 222 for the restore directory 232 and has evaluated the snapshot file system 220 to identify the content items within the first directory to restore, the restore process groups the content items into batches to iteratively restore 230 from objects in the object store 208 comprising snapshot data (backup data) of the content items. In this way, the restore process restores batches of content items of the first directory to the restore directory 232, during operation 108 of method 100.

For a batch of content items to restore (e.g., a first batch of 8 files and/or subdirectories within the first directory), the restore process evaluates the mapping 223 to identify objects comprising snapshot data (backup data) of the batch of content items. That is, the first snapshot 210 captures a point-in-time representation of the first directory that is to be restored. Snapshot data of the first snapshot 210 is stored in one or more objects within the object store 208. The mapping 223 tracks a set of objects comprising snapshot data (backup data) of the first directory and content items within the first directory. The mapping 223 is evaluated to identify objects that comprise snapshot data (backup data) of the batch of content items currently being restored by the restore process.

Once the objects, comprising the snapshot data (backup data) of the batch of content items, have been identified, an API call including the checkpoint structure is issued to retrieve the snapshot data (backup data) of the batch of content items from the objects in the object store 208. The retrieved snapshot data (backup data) is used to restore the current batch of content items as restored content items in the restore directory 232. If a content item is a subdirectory, then the restore process recursively identifies and restores any content items (files and/or subdirectories) in the subdirectory to the restore directory 232. If a content item is a qtree, then the qtree is restored as a restored qtree in the restore directory 232. While restoring the batch of content items, links (e.g., hard links or soft links) within the directory is identified. For links that link to files in the first directory, the links are preserved as preserved links in the restore directory 232, which link to restored content items in the restore directory 232 (restored link to restored files that were linked to by the original links in the first directory). If a link in the first directory links to an external content item not located in the first directory, then the external content item is retrieved from the object store 208 (e.g., retrieved from one or more objects comprising backup data of the external content item in the object store 208). The external content item is restored into the restore directory 232 as a restored external content item that replaces the link in the restored directory 232 even though the external content item was not originally stored within the first directory.

Once the restore process successfully restores the batch of content items into the restore directory 232, the restore process updates the checkpoint structure 224 to indicate that the batch of content items have been successful restored. The restore process uses the checkpoint structure 224 as an indicator of which content items have been restored and which content items still need to be restored. In this way, the restore process restores a next batch of content items to the restore directory 232. The restore process restores batches of content items to the restore directory 232 until the entire first directory has been restored as the restore directory 232.

Figure 2E:
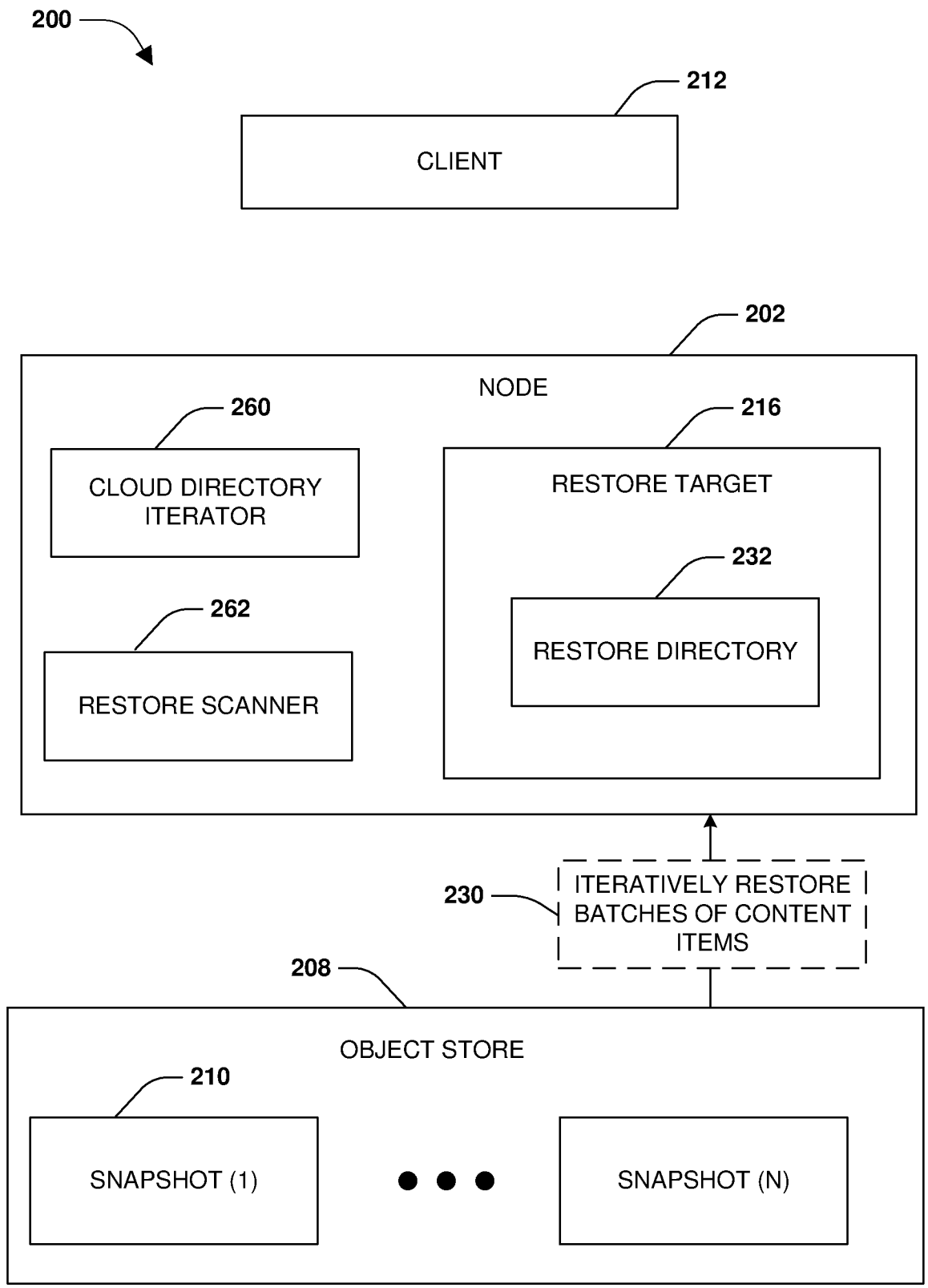
FIG. 2E is a block diagram illustrating an example system restoring a directory using a snapshot backed up to an object store in accordance with various embodiments of the present technology.

In some embodiments, a restore process to restore a directory from a source snapshot to a restore target as a restore directory is implemented by a cloud directory iterator 260 and a restore scanner 262, as illustrated by FIG. 2E. The cloud directory iterator 260 is configured to iterator the directory in the object store 208. The cloud directory iterator 260 takes a directory identifier field, a snapinfo object of the source snapshot, and endpoint information of where snapshot data of the source snapshot is stored as objects within the object store 208. The cloud directory iterator 260 takes as input and also outputs an iterator checkpoint structure, such as an iterator cookie, which includes a file block number (fbn) and index within the file block number. The file block number and index point to a content item (file) in a directory block of the directory after which directory entries, corresponding to a batch of content items, will be returned and restored to the restore directory. The cloud directory iterator 260 outputs a list of file inode information for content items (files) in the batch of content items (e.g., 8 content items or any other number of content items may be restored as a batch). The list of file inode information includes information such as an inode number, an inode type (e.g., directory or file), access control lists, and/or streams associated with the directory or the content items within the directory being restored.

In some embodiments, directory objects are stored as directory blocks for a backup stored within an object store (e.g., a cloud backup). For example, the directory objects are stored as directory blocks similar to a format used by a storage file system format, but are in a normalized form. A directory block contains a list of directory entries. A directory entry maps to a file or a subdirectory within a directory. A cloud format for a directory block is include a directory header, a directory entry (0) nested under the directory header, a directory name (0) through a directory name (n) nested under the directory entry (0), a directory entry (1) nested under the directory header, a directory name (0) through a directory name (n) nested under the directory entry (1), a directory entry (2) nested under the directory header, a directory name (0) through a directory name (n) nested under the directory entry (2), etc. The directory name includes a name type field, a name length field, a padding field, and the actual directory name. The directory entry includes a directory entry size, a directory entry name offset (e.g., an offset from the start of the directory entry structure where the directory entry name starts), a directory entry index (e.g., an entry number is a source directory block), a directory entry number of names (e.g., a number of names that follow), a directory entry inode of the directory entry, a generation number of the directory entry, a directory entry file group index, a directory entry file group file type, a directory entry name info flags (e.g., name info flags per entry), an opaque name index of the directory entry, a directory entry padding, and/or the actual directory entry names. A number of directory number entries can be used to determine if there is another entry expected and a directory entry size can be used to determine where to find this next entry. The cloud directory iterator 260 issues a cloud snapshot difference message to obtain file block numbers that map to directory block locations in the directory objects. The index within the file block number points to the directory entry.

The cloud directory iterator 260 uses the checkpoint structure (e.g., as a cookie field) to perform an API call to obtain a next batch of content items to retrieve and restore. This API determines whether the input checkpoint structure is valid. If the checkpoint structure is valid, then a diffing operation will start from the file block number indicated by the checkpoint structure. The file block number corresponds to a next content item to restore. If the checkpoint structure has all zero values (e.g., no content items have yet been restored), then the diffing operation will begin from the beginning for the directory inode. In some embodiments, the diffing operation is a module that detects changes between two snapshots stored within an object store (cloud). The diffing operation (e.g., a cloud snapshot diff operation) is performed by diffing a directory L0 block (e.g., user data blocks) in the source snapshot being used to perform the restore process with a Null snapshot to determine the directory's file block numbers to be read. A cloud snapshot read operation is performed upon these file block numbers for the directory L0 blocks identified by the diffing operation. The cloud snapshot read operation will return denormalized directory blocks. The content item names can be extracted out of the denormalized directory block. A get inode info message is sent for the batch of content items currently being restored (e.g., 8 files currently being restored) to obtain inode information such as inode type (directory or file). This get inode info message also returns the access control lists and streams for the content items. Since the cloud directory iterator 260 will return information for a batch of content items (e.g., 8 files) at a time, an optional step would be to cache the remaining file names that were obtained. The remaining file names are used during a next call of the cloud directory iterator 260 to restore a next batch of content items. This would optimize the number of object store calls to the object store 208 since each directory L0 object can contain a large amount of files. The cloud directory iterator 260 returns the inode information along with the updated checkpoint structure which would indicate the file block number and offset up to which the file inode information has been obtained for restoring the batch of content items.

A workflow is implemented to determine if a request to perform the restore process is a directory restore. If so, then the workflow creates an empty parent directory (a restore directory) and triggers the restore scanner 262. The restore scanner 262 sets up a cloud context for a file system restore scanner. The restore scanner 262 reads access control lists for the directory and creates the access control lists for the restore directory. The restore scanner 262 check if there is a valid checkpoint structure (cookie) for the directory in a transfer state metafile. In some embodiments, the transfer state metafile is a metafile created at the start of a backup transfer to an object store to record any metadata of a current transfer, which includes a transfer type, transfer snapshot, transfer characteristics, etc. Checkpoint information is updated periodically in the transfer state metafile is read during a restart phase, and the checkpoint information is used to restart the transfer from a last checkpoint. The transfer state metafile is deleted once transfer completes.

If valid, then the restore scanner 262 reads the checkpoint structure (cookie) and coverts the checkpoint structure to an iterator checkpoint structure (iterator cookie). If invalid, then the restore scanner 262 creates a default iterator checkpoint structure (iterator cookie). The restore scanner 262 triggers the cloud directory iterator 260 and passes in the iterator checkpoint structure (iterator cookie) as an input. The cloud directory iterator 260 will return file information for a batch of content items in the directory being restored along with an updated checkpoint structure.

The restore scanner 262 creates base content items (files) and a fence for the content items returned by the cloud directory iterator 260. The restore scanner 262 writes inode mappings of these base content items to corresponding cloud inodes of the current batch of content items to the checkpoint structure in the transfer state metafile. When storing checkpoint information, the restore scanner 262 saves the inode mappings of files that are already created as part of the restore process. The restore scanner 262 records the mapping of current file inode information in the file system to inode information in the object store (cloud). Thus, the files do not have to be recreated again on restart, and are mapped correctly.

The restore scanner 262 creates access control lists and streams for the content items based on the information received from the cloud directory iterator 260. The restore scanner 262 triggers the file system restore scanner to perform single file restore processes in parallel for this batch of content items. Each single file restore process restores a content item to the restore directory as a restored content item. Once the single file restore process complete, the restore scanner 262 converts the iterator checkpoint structure to the checkpoint structure. The restore scanner 262 writes this checkpoint structure to the transfer state metafile and clears out the inode mappings while doing the write. The restore scanner 262 unfences the content items of the completed batch of content items. The restore scanner 262 checks to see if an end of file for the cloud directory iterator 260 has been reached. If not, then a next batch of content items are stored. If yes, then all content items in the directory have been restored to the restore directory and a cleanup procedure is performed.

In some embodiments of performing checkpointing for the restore process, certain information is persisted. This information relates to identifying a point up to which the single file restore processing of content items has been completed to successful restore those content items to the restore directory as restored content items. This information indicates progress of the restore process so far. With each call to the cloud directory iterator 260, an iterator checkpoint structure is obtained and indicates the file block number and offset up to which the file inode numbers (e.g., inode numbers of the content items being restored) have been read. Once the single file restore processing has restored a batch of content items, this iterator checkpoint structure information is persisted. The granularity of the checkpoint corresponds the number of content items in the batch that can be restored in parallel by the single file restore processing.

If single file restore processes are processing a batch of content items when a restart of the restore process occurs (e.g., the restore process fails and is restarted), then the checkpoint information also contains inode mappings of the cloud inodes of the content items (e.g., cloud inodes corresponding the content items backed up to the object store 208) to destination file inodes of the restored content items (e.g., file inodes for the restored content items at the restore target 216). In order to restart from a checkpoint, checkpoint information is read from the transfer state metafile. If the checkpoint structure is valid, then the checkpoint structure is converted to an iterator checkpoint structure which is passed to the cloud directory iterator 260. The cloud directory iterator 260 will read and return the next set of content items after the checkpoint of content items already successfully restored. Next, the inode mapping part of the checkpoint information is examined. If valid inode mappings exist, then the valid inode mappings are used to trigger the file system restore scanner 262.

Figure 3:
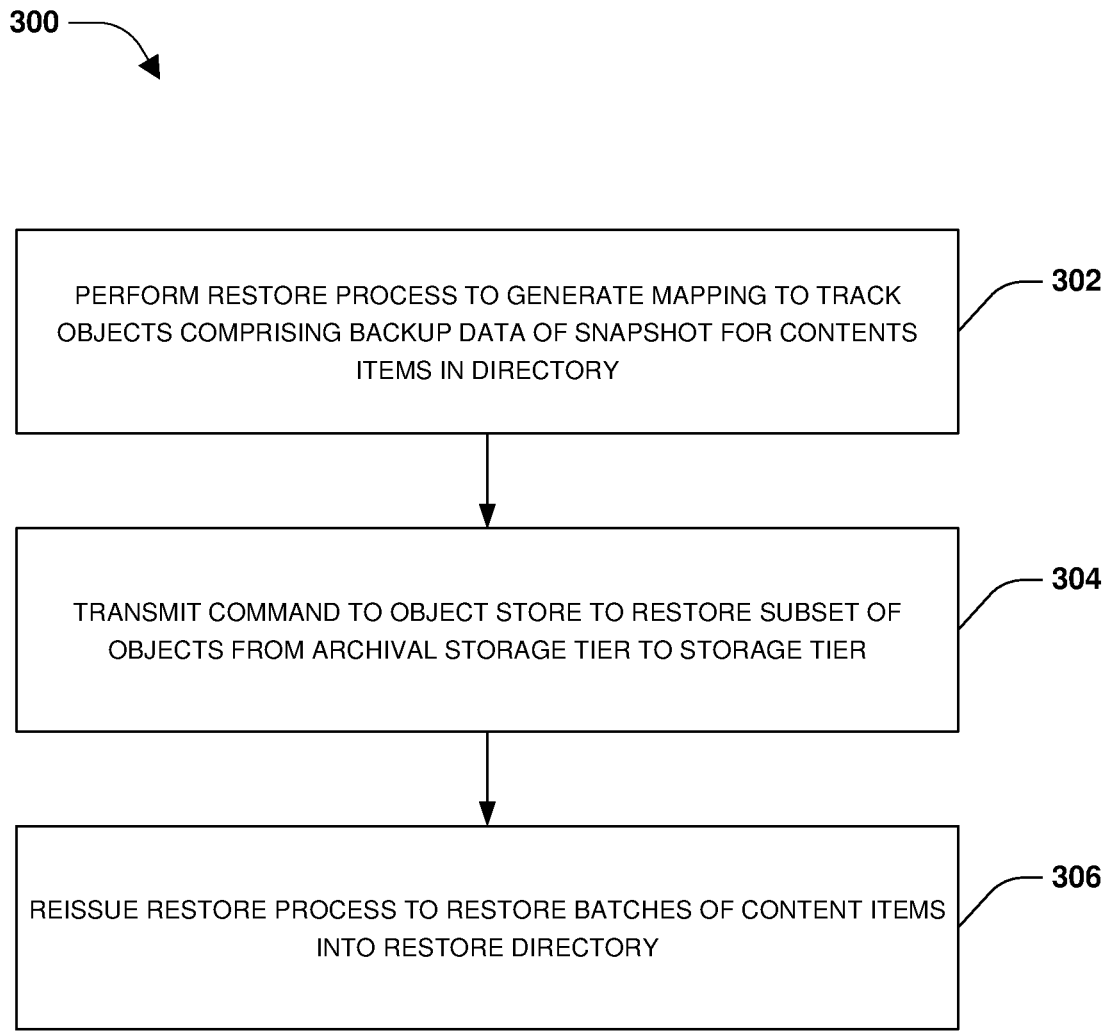
FIG. 3 is a flow chart illustrating an example method for restoring a directory using a snapshot backed up to an object store where snapshot data of the snapshot is stored across a storage tier and an archival storage tier of the object store in accordance with various embodiments of the present technology.
Figure 4A:
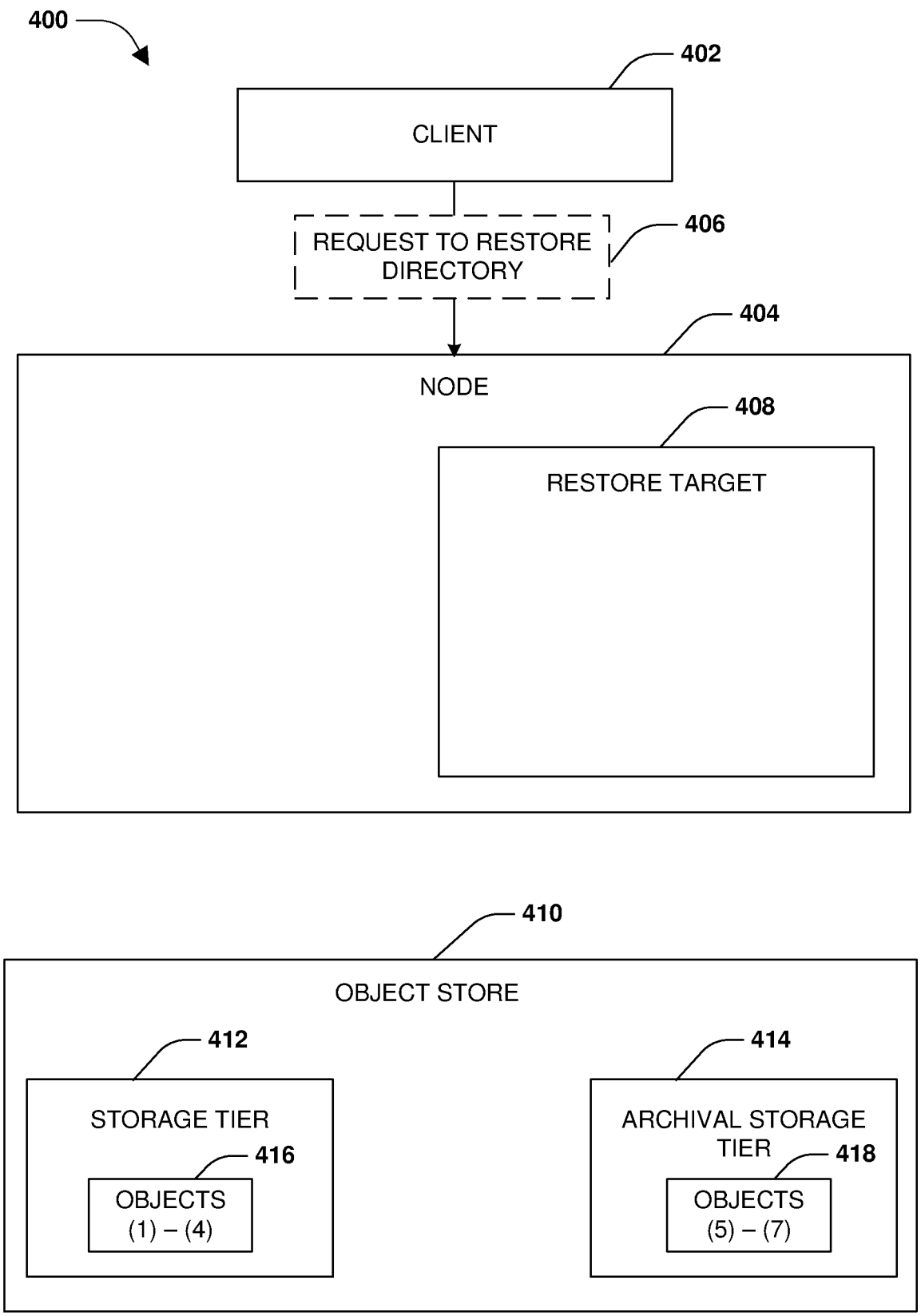
FIG. 4A is a block diagram illustrating an example system restoring a directory using a snapshot backed up to an object store in accordance with various embodiments of the present technology, where a request to restore the directory is received.
Figure 4B:
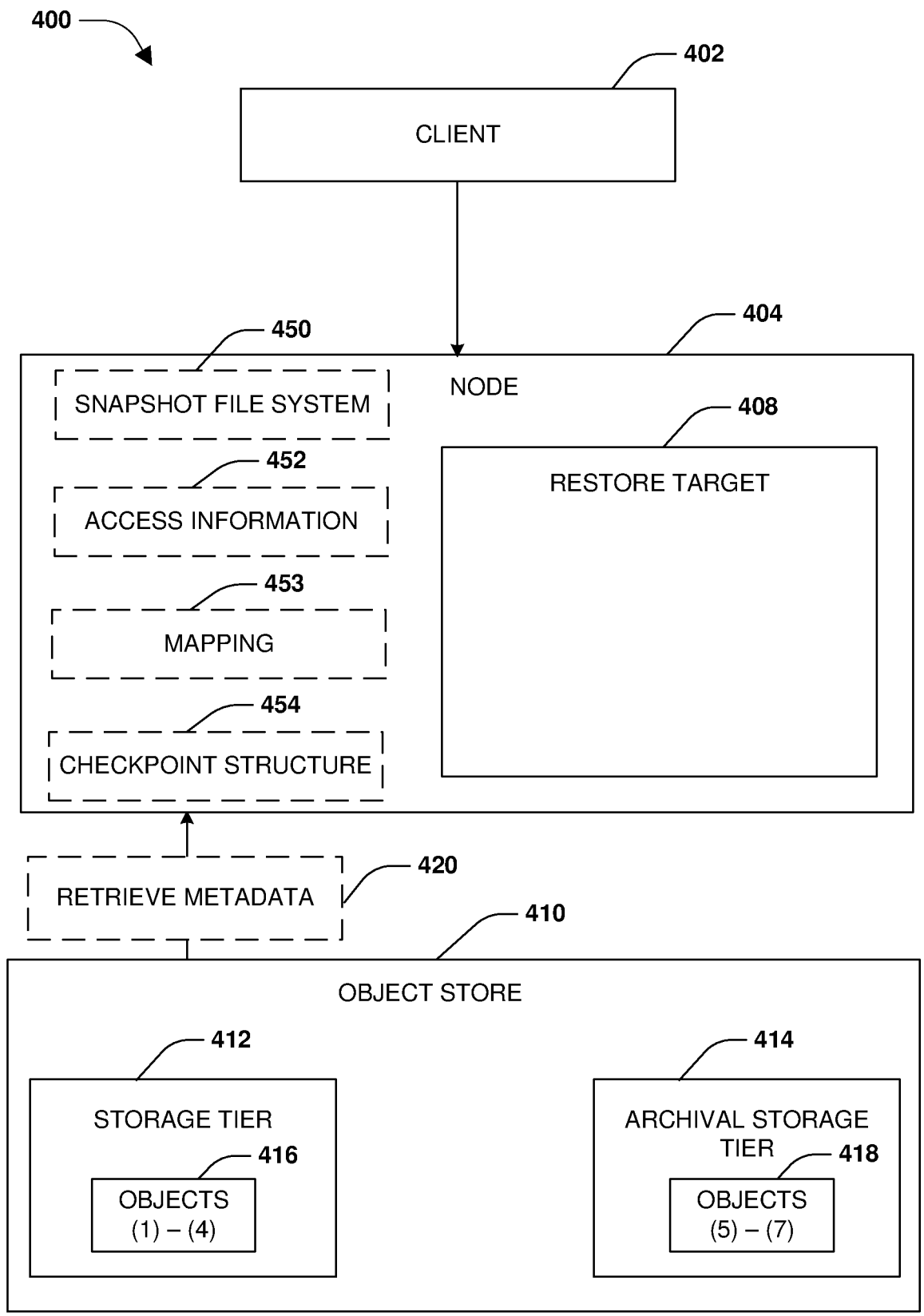
FIG. 4B is a block diagram illustrating an example system restoring a directory using a snapshot backed up to an object store in accordance with various embodiments of the present technology, where metadata associated with the snapshot is restored.

One embodiment of restoring a directory from a snapshot in an object store is illustrated by an exemplary method 300 of FIG. 3, which is further described in conjunction with system 400 of FIGS. 4A-4D. A client 402 transmits a request 406 to a node 404 to restore a directory to a restore target 408, as illustrated by FIG. 4A. The request 406 indicates a source snapshot to use for restoring the directory. The source snapshot captures a point-in-time representation of a volume comprising the directory. Snapshot data of the source snapshot is stored in objects within an object store 410. In some embodiments, the objects may correspond to objects 416 (e.g., object (1), object (2), object (3), and object (4)) stored in a storage tier 412 of the object store (e.g., a standard storage tier accessible to the node 404). In some embodiments, the objects also corresponds to objects 418 (e.g., object (5), object (6), and object (7) not directly accessible to the node 404) archived into an archival storage tier 414 (e.g., a low cost glacier storage tier) of the object store 410. In response to receiving the request 406, the node 404 restores access information 452, such as access control lists and/or streams associated with the directory, from the object store 410, as illustrated by FIG. 4B. The node 404 also retrieves metadata 420 associated with the source snapshot. The metadata 420 comprises a snapshot file system 450 of the source snapshot. The snapshot file system 450 is used to identify content items (files and directories) captured by the source snapshot. An embodiment of the snapshot file system 450 is illustrated by FIG. 8B.

During operation 302 of method 300, a restore process is initiated. The restore process is initiated to generate a mapping 453 that tracks a set of objects comprising snapshot data of the source snapshot for content items in the directory to be restored. In this way, the mapping 453 is evaluated to identify objects, such as the objects 416 and the objects 418, comprising snapshot data (backup data) of the directory and content items in the directory to restore to the restore target 408. The restore process determines that the objects 418 reside in the archival storage tier 414. For example, the restore process capable of interacting with the storage tier 412 but the object store 410 does not allow the node 404 to directly interact with or access the archival storage tier 414. When the restore process attempts to access an object from the storage tier 412 for restoring snapshot data in the object to the restore target 408, the restore process will fail if the object store 410 returns an invalid object state for the object because the object does not reside in the storage tier 412. This may occur if the object instead resides in the archival storage tier 414. Accordingly, the mapping 453 and/or other information is used to identify the objects 418 that are not in the storage tier 412, but have instead been archived to the archival storage tier 414 for lower cost long term archival storage.

Figure 4C:
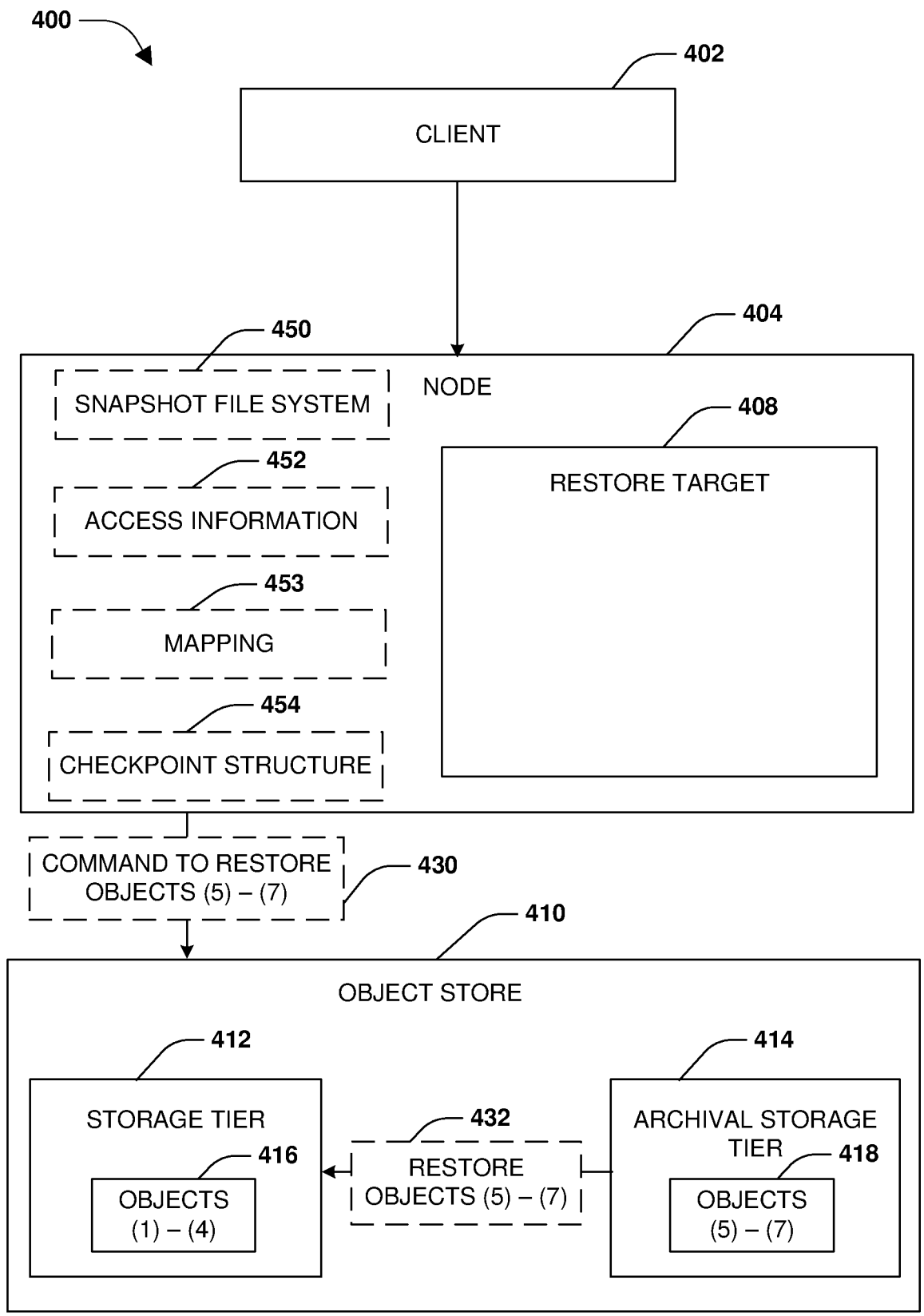
FIG. 4C is a block diagram illustrating an example system restoring a directory using a snapshot backed up to an object store in accordance with various embodiments of the present technology, where objects within an archival storage tier are restored to a storage tier of the object store.
Figure 4D:
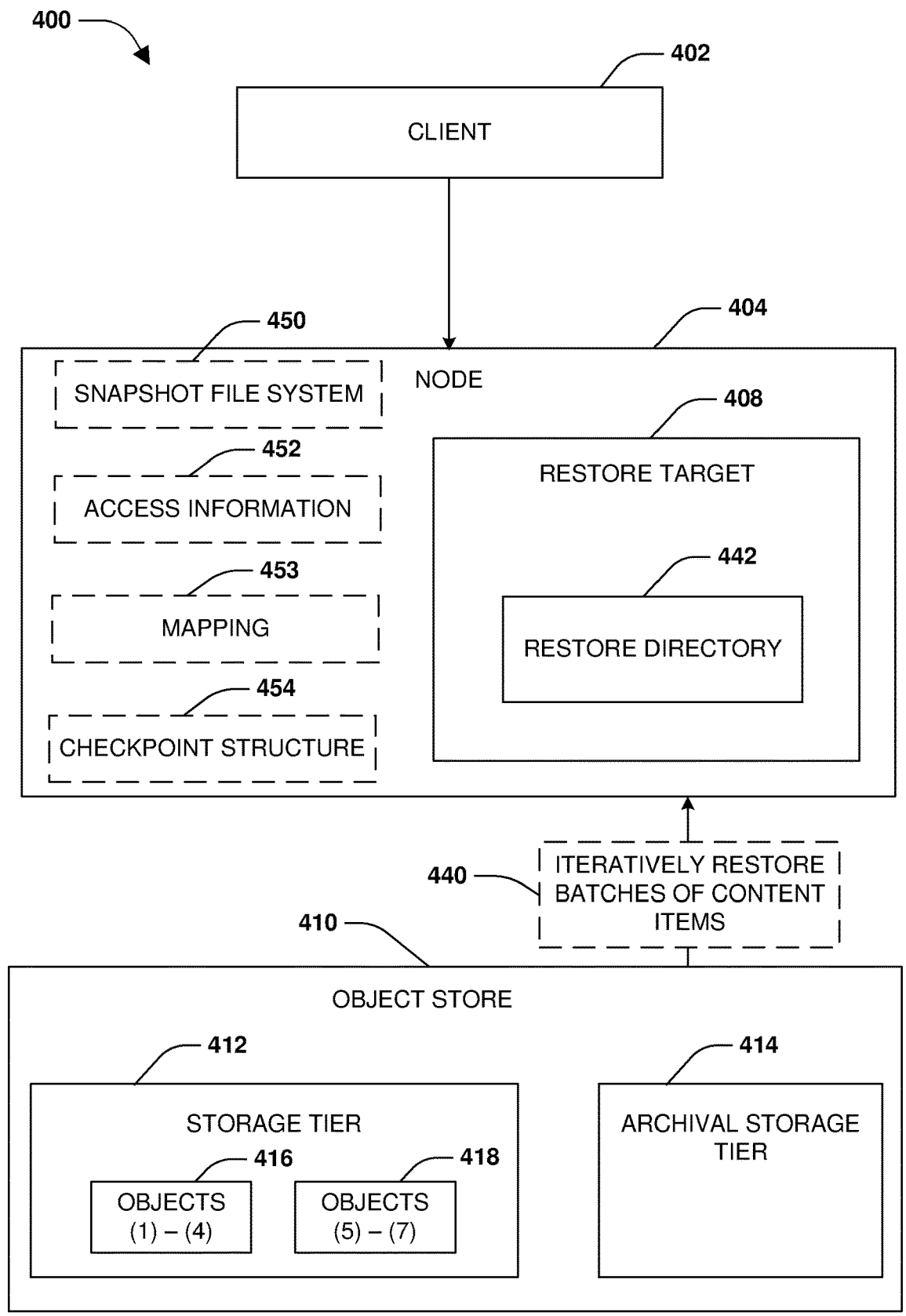
FIG. 4D is a block diagram illustrating an example system restoring a directory using a snapshot backed up to an object store, where batches of content items within the directory are iteratively restored.

Accordingly, during operation 304 of method 300, the restore process transmits a command 430 to the object store 410 to restore 432 the objects 418 from the archival storage tier 414 to the storage tier 412, as illustrated by FIG. 4C. Once the node 404 determines that the objects 418 have been restored 432 to the storage tier 412 (e.g., a timespan estimated for the restore 432 has elapsed), the node 404 reissues, during operation 306 of method 300, the restore process to iteratively restore 440 batches of the content items of the directory to the restore target 408 to create and populate a restore directory 442 as a restored version of the directory, as illustrated by FIG. 4D. The reissued restore process uses a checkpoint structure 454 to track progress of restoring the directory from the objects 416 and the objects 418 in the storage tier 412 of the object store 410 to the restore target 408 as the restore directory 442.

In some embodiments of performing a restore process to restore a directory, content item identifiers (file identifiers of files within the directory) are obtained from a cloud directory iterator. Single file restore processes are implemented to restore each content item. If there is a failure because there is an invalid object state error where a single file restore process cannot access an object within the storage tier 412 of the object store 410 because the object is actually in the archival storage tier 414 of the object store 410, then content item identifiers are obtained from the cloud directory iterator for objects in the archival storage tier 414. A cloud snapshot diffing API is issued on the content item identifiers using a restore from archive diffing session. Object identifiers returned by the cloud snapshot diffing API are saved to an archival object identifier map. The archival object identifier map is used to issue restore commands to the object store 410 to restore objects from the archival storage tier 414 to the storage tier 412. After, the restore process is reissued because all of the content items will now be located in the storage tier 412. In this way, the directory will be restored by the reissued restore process.

Figure 5:
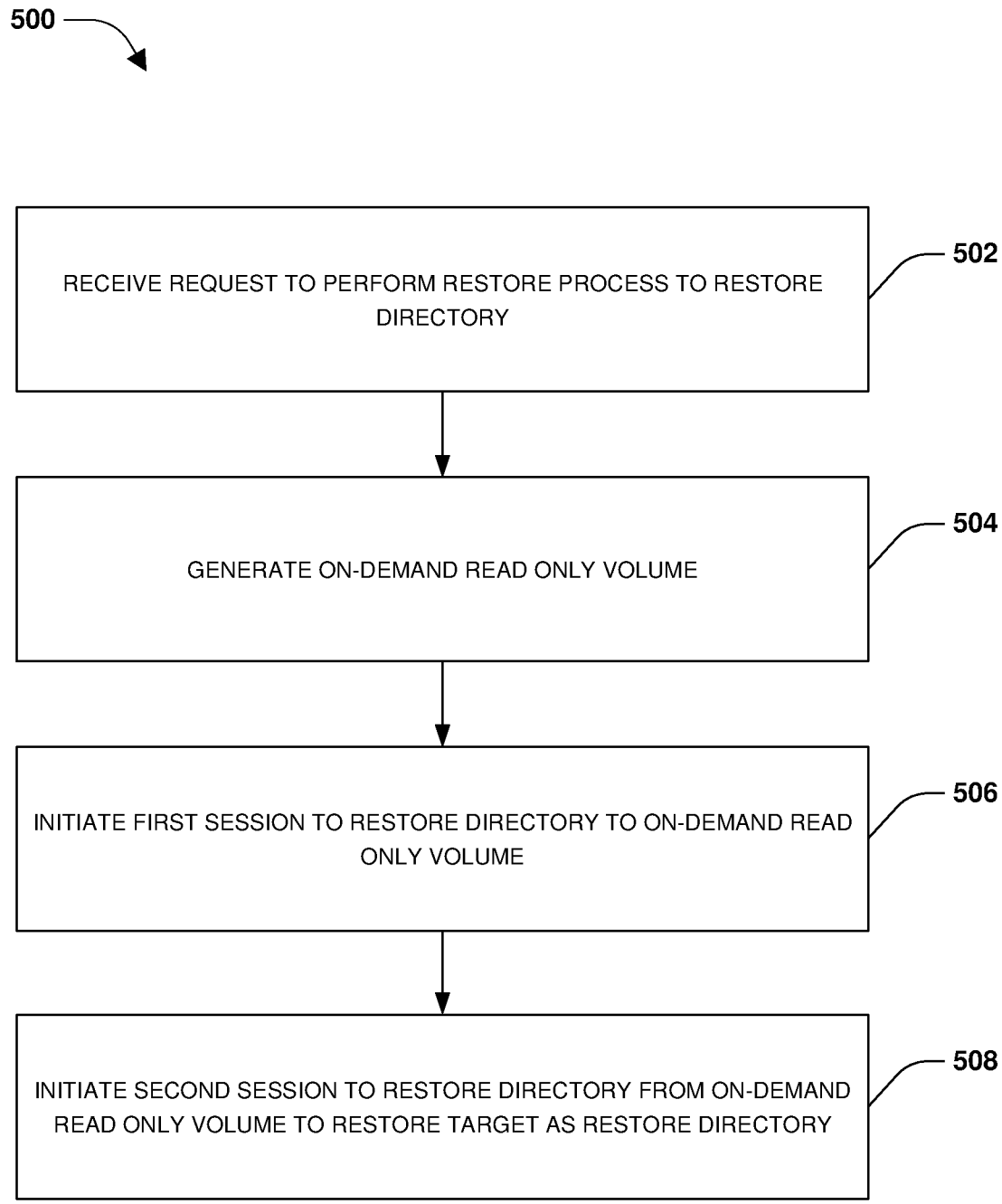
FIG. 5 is a flow chart illustrating an example method for restoring a directory using a snapshot backed up to an object store in accordance with various embodiments of the present technology.
Figure 6A:
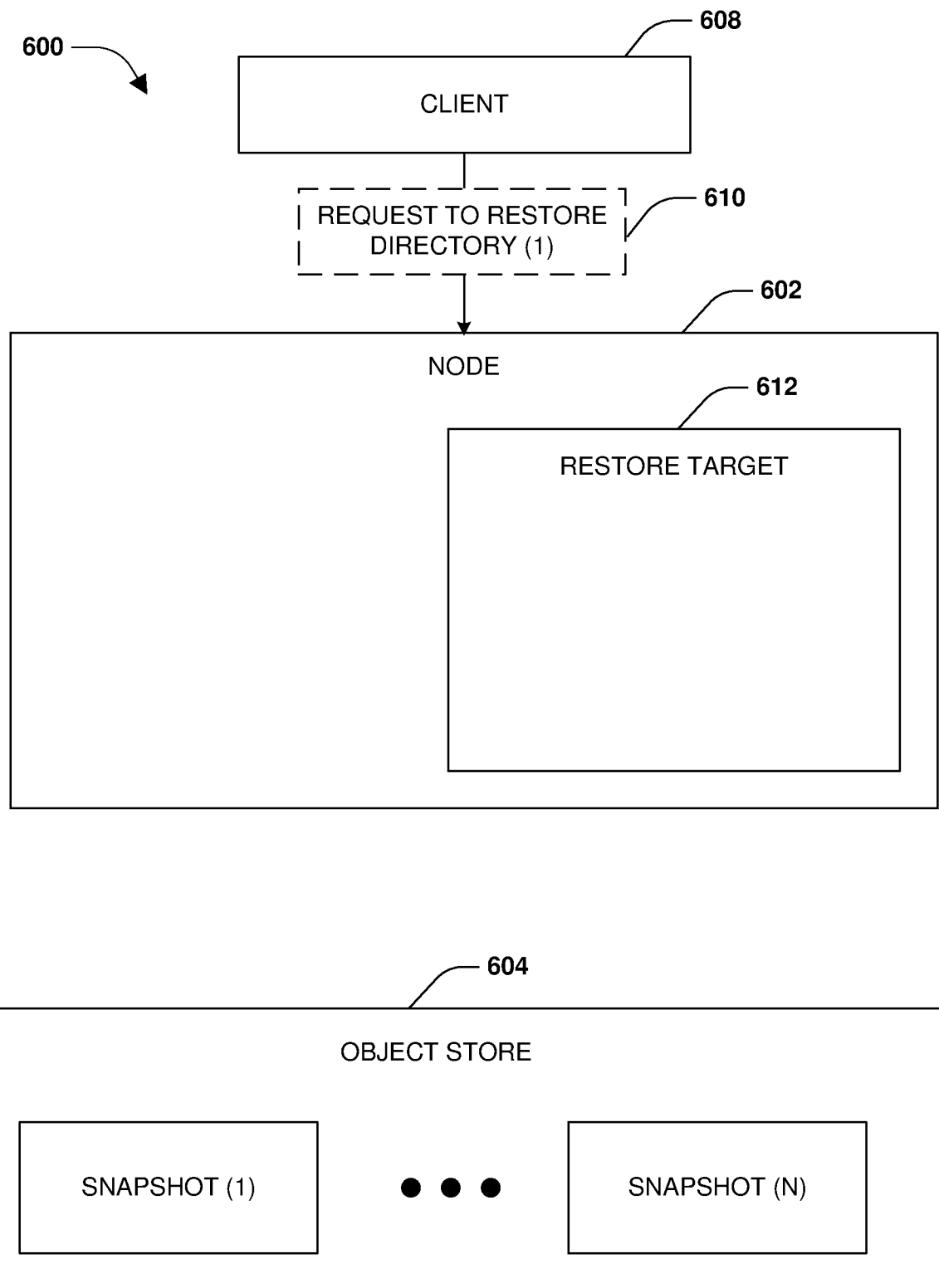
FIG. 6A is a block diagram illustrating an example system restoring a directory using a snapshot backed up to an object store in accordance with various embodiments of the present technology, where a request to restore the directory is received.
Figure 6B:
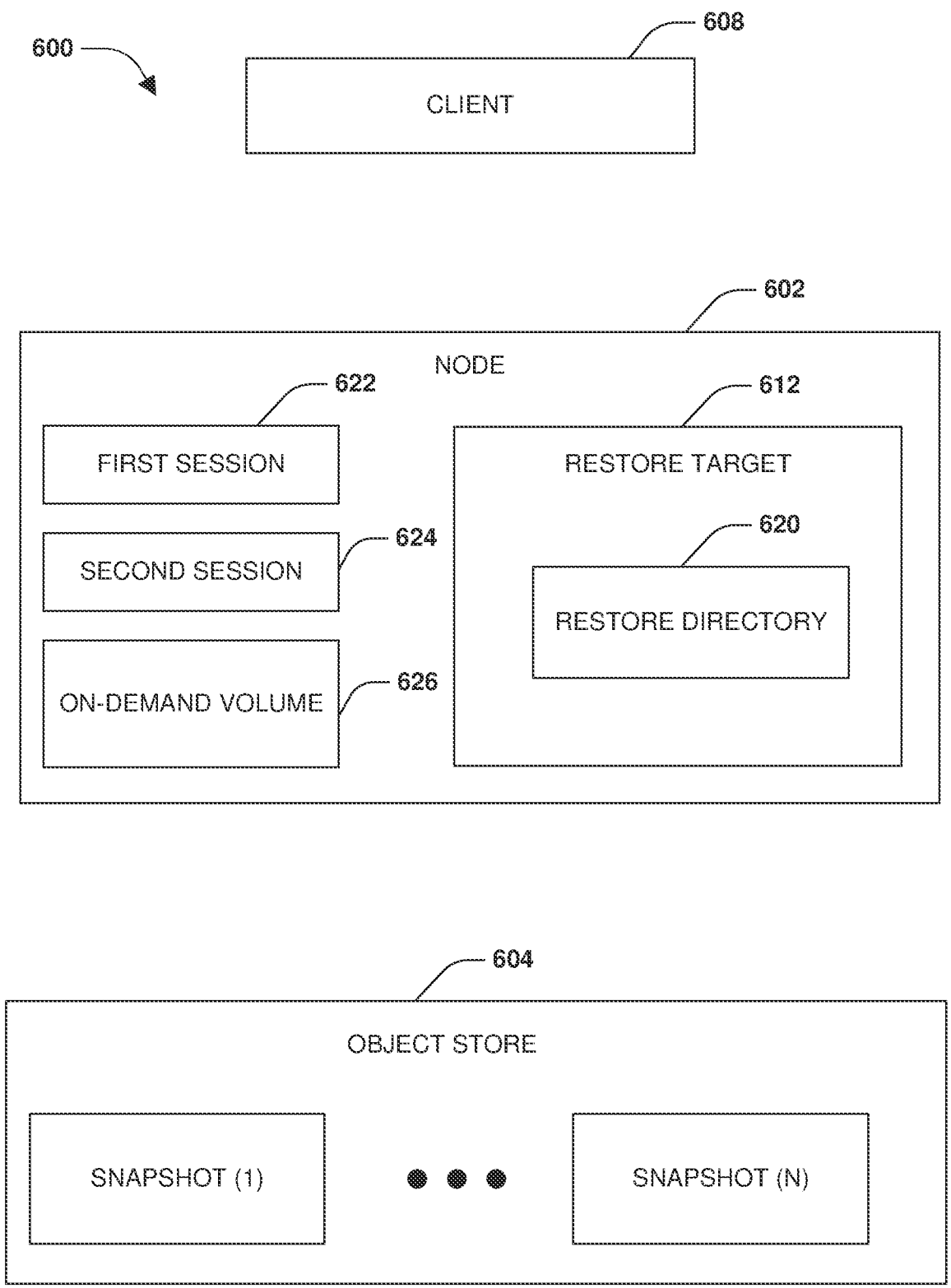
FIG. 6B is a block diagram illustrating an example system restoring a directory using a snapshot backed up to an object store in accordance with various embodiments of the present technology, where an on-demand volume is created and used to restore the directory.

One embodiment of restoring a directory from a source snapshot in an object store 604 using an on-demand read only volume 626 is illustrated by an exemplary method 500 of FIG. 5, which is further described in conjunction with system 600 of FIGS. 6A and 6B. During operation 502 of method 500, a client 608 transmits a request 610 to a node 602 to restore a directory to a restore target 612, as illustrated by FIG. 6A. The request 610 may indicate a source snapshot to use for restoring the directory. The source snapshot captures a point-in-time representation of a volume comprising the directory. Snapshot data of the source snapshot are stored in objects within an object store 604. A restore process is initiated to restore snapshot data (backup data) of the directory from objects in the object store 604 to create a restore directory 620 within the restore target 612.

As part of the restore process, metadata associated with the source snapshot is retrieved from the object store 604. The metadata identifies blocks comprising the backup data of the source snapshot (e.g., blocks of data stored within objects in the object store 604). In an embodiment, the metadata corresponds to a tree structure, such as a buftree, comprising one or more levels of indirect blocks (pointers) that may be traversed from a root of the tree structure down through the tree structure to a bottom level of direct blocks corresponding to actual data (L0 blocks). The metadata (e.g., a level of indirect blocks that point to the bottom level of direct blocks) comprises virtual volume block number entries mapped to physical volume block number entries. For example, a block of backup data within the source snapshot is associated with a virtual volume block number entry that is mapped to a physical volume block number entry. If the block has not yet been restored from the source snapshot to the on-demand read only volume 626, then the virtual volume block number entry may be populated with a cloud block number of the block. The cloud block number corresponds to a location of the block stored within the object store 604, and thus may be used to locate and retrieve the block from the object store 604. Also, if the block has not yet been restored from the source snapshot to the on-demand read only volume 626, then the physical volume block number entry is populated with an absent indicator to indicate that backup data of the block has not yet been restored to on-demand read only volume 626 and stored within storage managed by the node 602.

During operation 504 of method 500, the on-demand read only volume 626 is created using the metadata. The on-demand read only volume 626 may initially be an empty volume. Unlike a traditional volume where all client requests for data are processed through a file system of the traditional volume using data stored within the traditional volume, access to the on-demand read only volume 626 can result in either retrieving already restored data from the on-demand read only volume 626 or an on-demand retrieval of not yet restored data from the source snapshot within the object store 604. The on-demand read only volume 626 may be used as a staging area for restoring the directory. The on-demand read only volume 626 is a pass-through staging area, thus the space required for the directory is not used by the on-demand read only volume 626. The restore directory 620 is created in the restore target 612 so that content items of the restore directory 620 can be restored into the restore directory 620. The restore process restores and apply access permissions to the restore directory 620, such as access control lists and/or streams.

During operation 506 of method 500, a first session 622 is initiated to restore the directory from objects in the object store 604 that comprise snapshot data (backup data) of the directory to the on-demand read only volume 626. During operation 508 of method 500, a second session 624 is initiated to restore the directory from the on-demand read only volume 626 into the restore directory 620 at the restore target 612. The sessions may correspond to a network data copy functionality. The network data copy functionality is implemented to restore file modify times of content items within the restore directory 620 to match file modify times specified within the source snapshot for the content items. The network data copy functionality provides access to the access permission that are restored. The network data copy functionality restores LUNs, nested directories, and/or character/block device files. A block device file may be used to access block device I/O, which may be used to perform buffered I/O. Character device files may be associated with raw device access, which may be used to performed unbuffered data transfer to and from a storage device. The network data copy functionality is used to restore hardlinks within the directory as restored hardlinks. A hardlink count is reflected to not include any hardlinks referenced from outside the directory. The network data copy functionality is used to identify symbolic links. If a symbolic link points to a file in the directory, then the symbolic link is retained. If the symbolic link points to a file outside the directory, then the symbolic link will be a dangling symbolic link because the file outside the directory is not being restored. Once the restore directory 620 is created and populated, the on-demand read only volume 626 is deleted.

Figure 7:
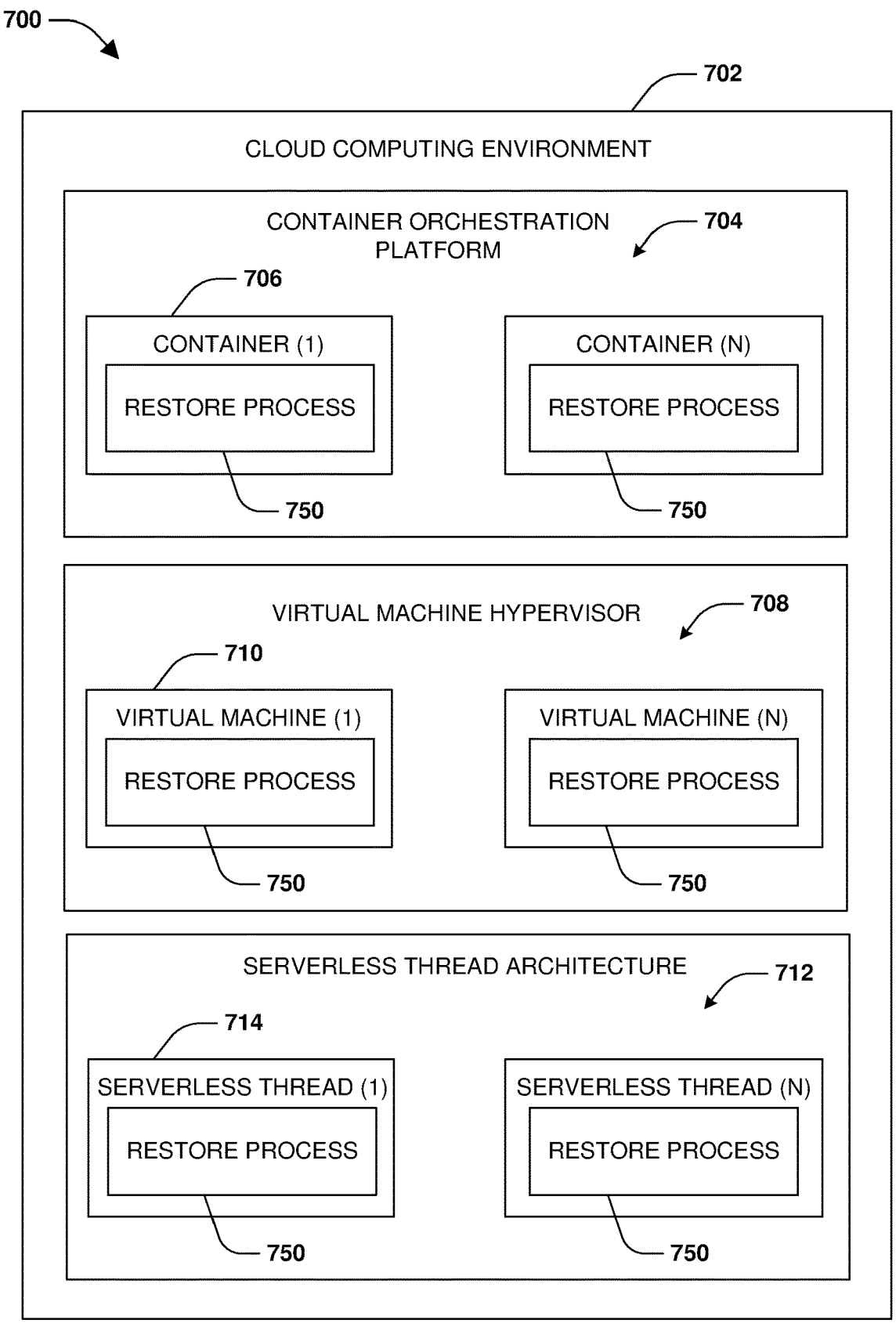
FIG. 7 is a block diagram illustrating an example cloud computing environment in which an embodiment of the present technology may be implemented.

FIG. 7 illustrates an example 700 of a cloud computing environment 702 within which the techniques described herein can be implemented. In some embodiments, a restore process 750 is implemented by the cloud computing environment 702 to perform a directory restore and/or other techniques described herein. The cloud computing environment 702 comprises servers, processors, memory, storage devices, and/or other resources that can be used by various types of environments for hosting instances of the restore process 750, such as a container orchestration platform 704, a virtual machine hypervisor 708, a serverless thread architecture 712, etc.

In some embodiments, the cloud computing environment 702 hosts instances of the restore process 750 within containers. In particular, the cloud computing environment 702 comprises the container orchestration platform 704, such as a Kubernetes environment. The container orchestration platform 704 creates containers such as a first container 706 for hosting instances of the restore process 750. The container orchestration platform assigns compute resources (e.g., CPU and memory resources) and storage resources to the first container 706. The first container 706 executes programming code of the restore process 750 using the assigned compute resources and storage resources. In this way, any number of instances of the restore process 750 are implemented through the container orchestration platform 704 by the cloud computing environment 702.

In some embodiments, the cloud computing environment 702 hosts instances of the restore process 750 within virtual machines. In particular, the cloud computing environment 702 comprises the virtual machine hypervisor 708. The virtual machine hypervisor 708 is configured to create and host virtual machines within the cloud computing environment 702. The virtual machine hypervisor 708 creates a first virtual machine 710 that executes programming code of the restore process 750 using resources of the cloud computing environment 702 provided by the virtual machine hypervisor 708 to the first virtual machine 710. The virtual machine hypervisor 708 can create and host any number of virtual machines for hosting instances of the restore process 750.

In some embodiments, the cloud computing environment 702 executes the programming code of the restore process 750 using serverless threads of a serverless thread architecture 712. A serverless thread is a thread of execution that is not tied to a particular server or other hardware, and can be executed using resources of the cloud computing environment 702 assigned to the serverless thread by the serverless thread architecture 712. In this way, any number of serverless threads, such as a first serverless thread 714, can be created on demand for executing the programming code of the restore process 750.

Figure 8A:
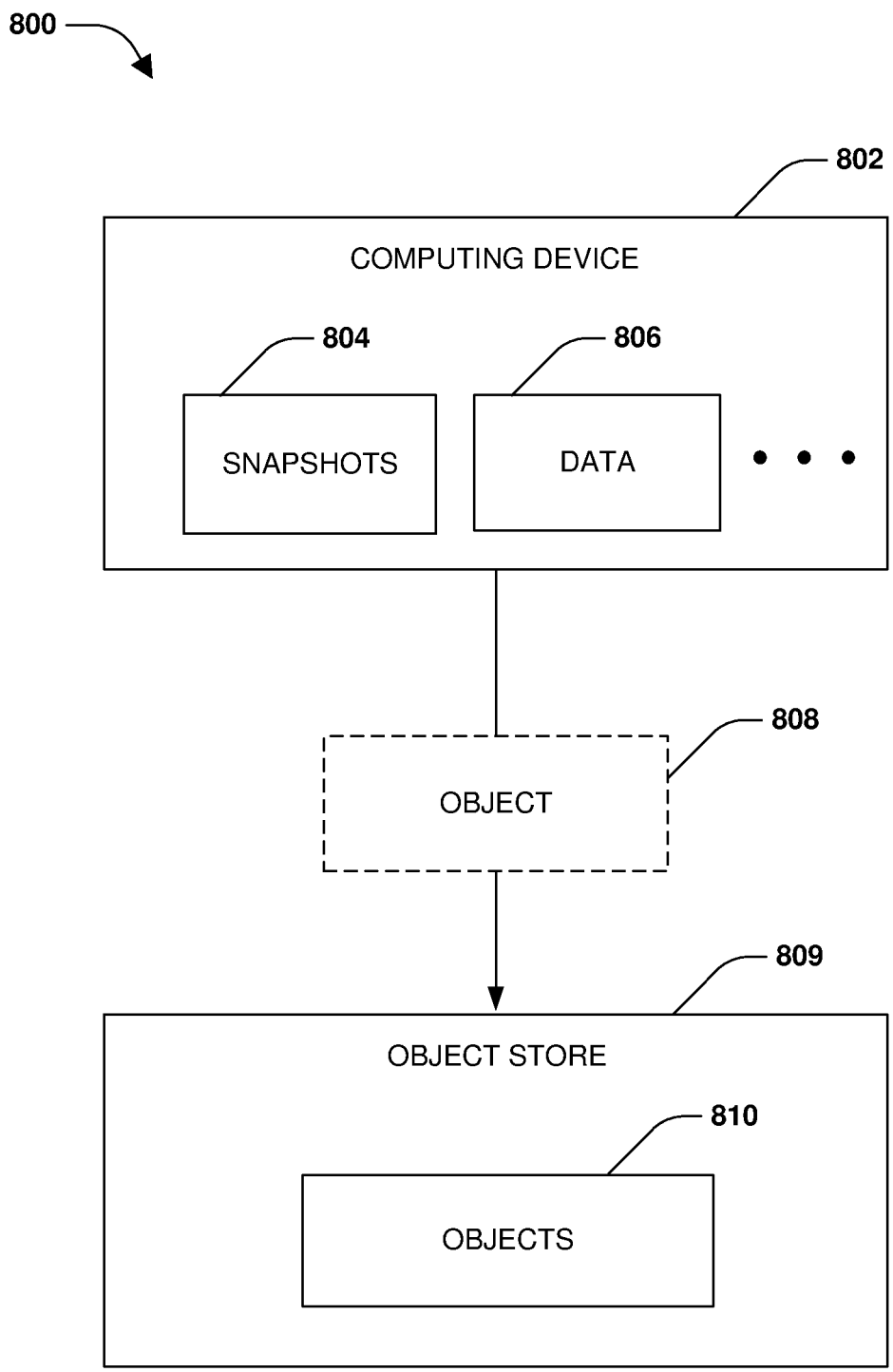
FIG. 8A is a component block diagram illustrating an example system for managing objects within an object store using a snapshot file system.
Figure 8B:
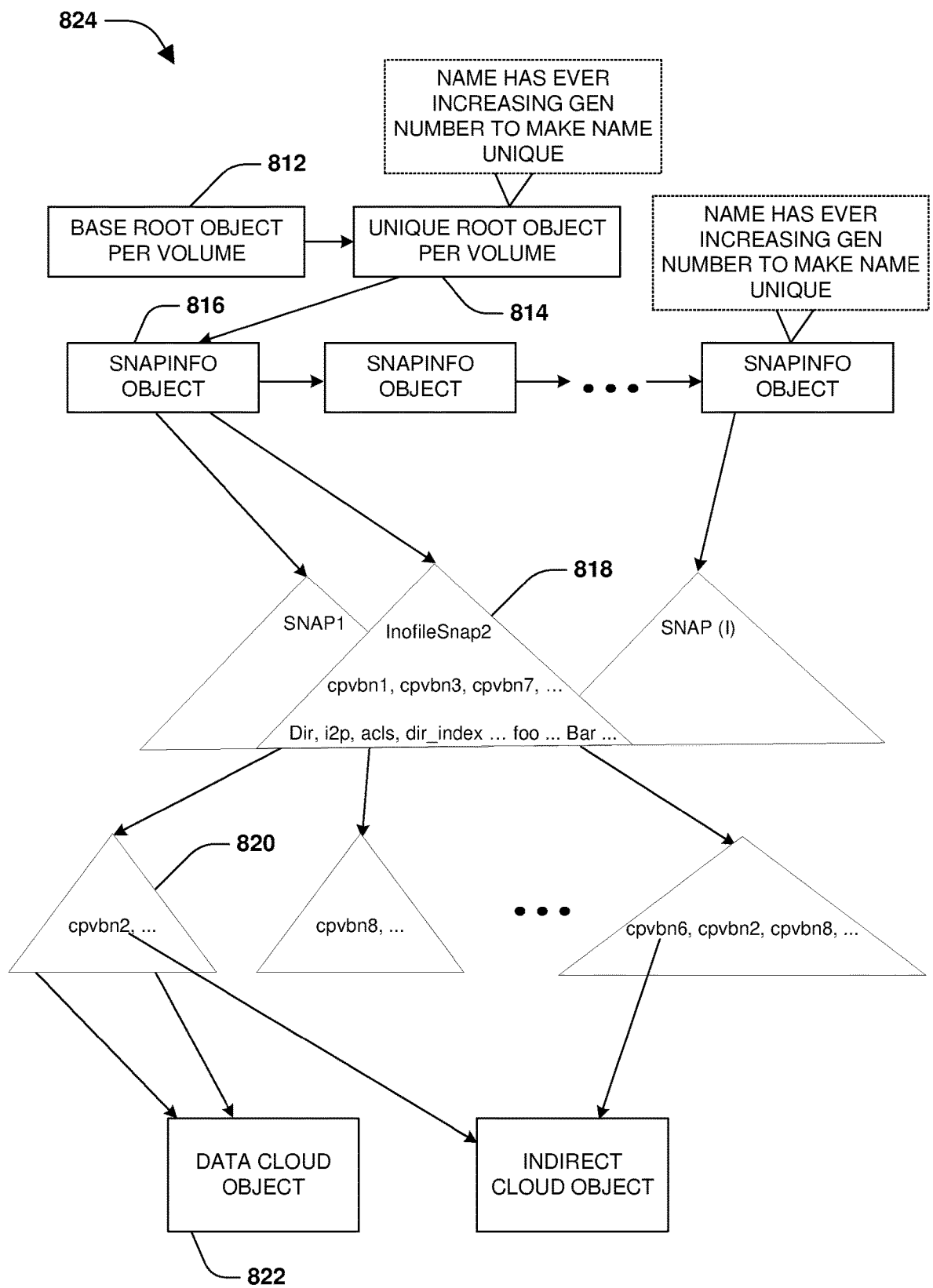
FIG. 8B is an example of a snapshot file system within an object store.

FIG. 8A illustrates a system 800 for managing objects within an object store (a remote object store) using a snapshot file system. The objects may store snapshot data of snapshots that can be restored on-demand to an on-demand volume using a restore process (e.g., an on-demand restore process) such that clients are provided with access to the snapshot data during and before completion of the restore process. A computing device 802 may comprise a node, a storage controller, a storage service, an on-premises computing device, a storage virtual machine, or any other hardware or software. The computing device 802 may store data 806 within storage devices (primary storage) managed by the computing device 802. The computing device 802 may provide client devices with access to the data 806, such as by processing read and write operations from the client devices. The computing device 802 may create snapshots 804 of the data 806, such as a snapshot of a file system of a volume accessible to the client devices through the computing device 802. The computing device 802 may be configured to communicate with an object store 809 over a network. The object store 809 may comprise a cloud computing environment remote to the computing device 802.

As provided herein, a snapshot file system and object format is provided for storing and accessing data, such as snapshots, stored within objects in the object store 809. The data 806, maintained by the computing device, is stored into a plurality of slots of an object 808. Each slot represents a base unit of data of the snapshot file system defined for the object store 809. For example, the object 808 comprises or any other number of slots (e.g., 1024 slots), wherein each slot comprises 8 kb of data or any other amount of data. It may be appreciated that objects may comprise any number of slots of any size. User data, directory blocks, metadata, and/or inofile blocks of an inofile comprising per inode metadata is stored into the slots of the object 808. In some embodiments, snapshot data, of a snapshot created by the computing device 802 of a file system maintained by the computing device 802, is stored into the object 808. For example, the object 808 may be maintained as an independent logical representation of the snapshot, such that data of the snapshot is accessible through the object 808 without having to reference other logical copies of other snapshots stored within objects 810 of the object store 809. In some embodiments, the data is converted from physical data into a version independent format for storage within the object 808.

In some embodiments, the object 808 is created to comprise data in a compressed state corresponding to compression of the data within the primary storage of the computing device 802. In this way, compression used by the computing device 802 to store the data is retained within the object 808 for storage within the object store 809. The object 808 may be assigned a unique sequence number. Each object within the object store 809 is assigned unique sequence numbers.

An object header may be created for the object 808. The object header comprises a slot context for slots within the object 808. The slot context may comprise information relating to a type of compression used for compressing data within the object 808 (if any compression is used), a start offset of a slot, a logical data length, a compressed data length, etc. The slot context may be used to access compressed data stored within the object 808.

Figure 8C:
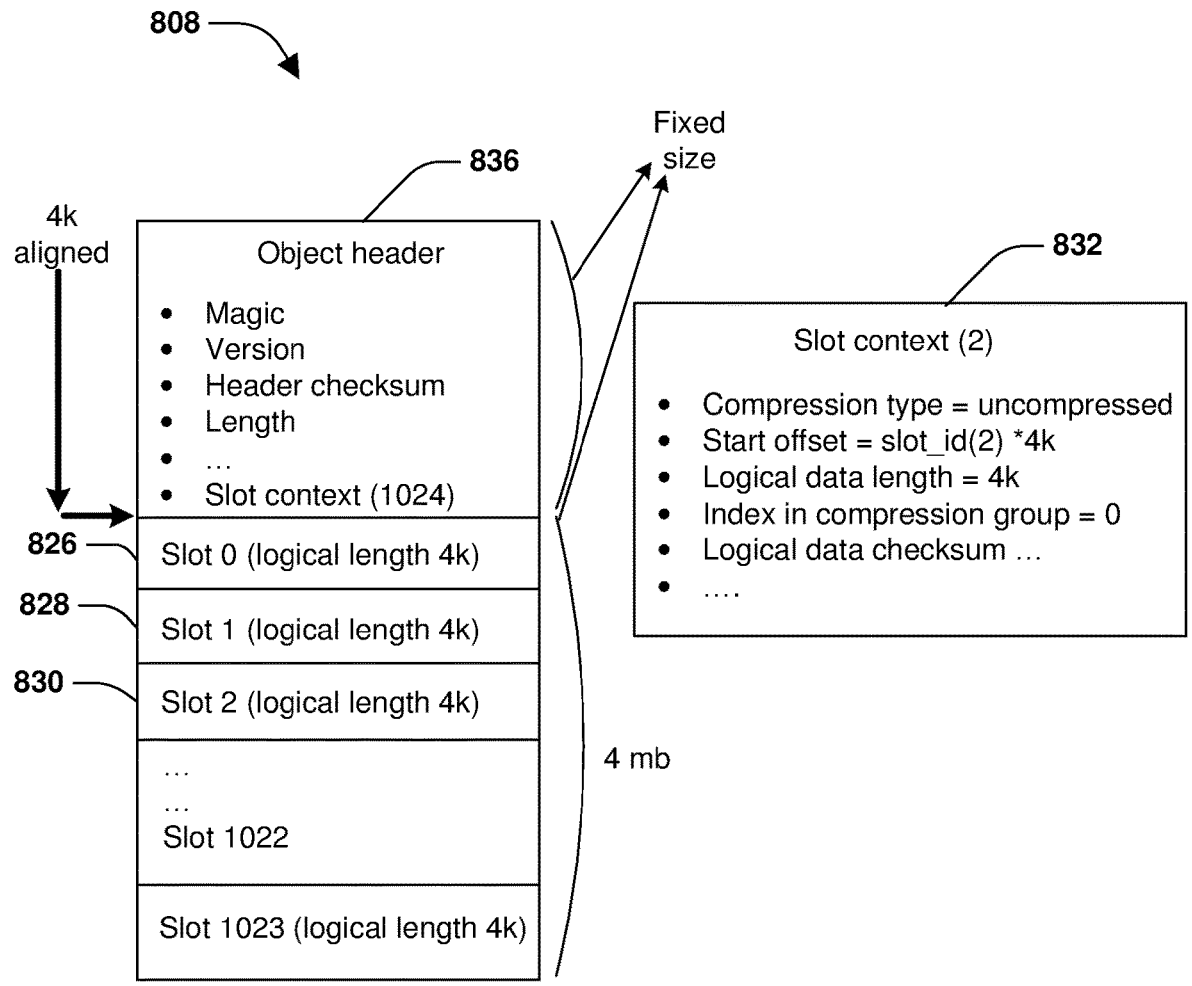
FIG. 8C is an example of an object stored within an object store.

FIG. 8C illustrates an example of the object 808. The object 808 comprises an object header 836 and a plurality of slots, such as a slot 826, a slot 828, a slot 830, and/or any other number of slots. The object header 836 may have a size that is aligned with a start of the plurality of slots, such as having an 8 kb alignment based upon each slot having a logical length of 8 kb. It may be appreciated that slots may have any length. The object header 836 comprises various information, such as a version identifier, a header checksum, a length of the object 808, a slot context 832, and/or other information used to access and manage data populated into the slots of the object 808.

The slot context 832 comprises various information about the slots, such as a compression type of a slot (e.g., a type of compression used to compress data of slots into a compression group or an indicator that the slot does not comprise compressed data), a start offset of the slot within the object 808 (e.g., a slot identifier multiplied by a slot size, such as 8 kb), a logical data length of the slot (e.g., 8 kb), a compressed length (e.g., 0 if uncompressed), an index of the slot within a compression group of multiple slots (e.g., 0 if uncompressed), a logical data checksum, etc.

The data stored within the slots of the object 808 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 808 and/or a slot number of a slot comprising a portion of the data represented by the node. User data, directory blocks, metadata, inofile blocks of an inofile, and/or other data stored within the slots of the object 808 may be represented by nodes within the data structure. In some embodiments, user data is stored within leaf nodes of the data structure (e.g., nodes within a level 0 (L0) level of the tree structure). Pointers (indirects) may be stored within non-leaf nodes of the data structure (e.g., nodes within a level 1(L1), a level 2 (L2), and/or other levels of the tree structure). An inode object for the file may comprise pointers that point to non-leaf nodes within a top level of the data structure.

In some embodiments of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 8B illustrates a snapshot file system of data structures 824 (e.g., a tree structure that can be traversed by a data connector component) used to represent snapshots (e.g., snapshots of one or more volumes managed by the computing device 802) stored into the objects 810 of the object store 809. There is one base root object per volume, such as a base root object 812 for a volume of which the snapshots were captured. There is a unique root object per volume, such as a unique root object 814 for the volume. The base root object 812 may point to the unique root object 814. Names of the unique root objects may be derived from increasing generation numbers. The unique root object 814 may point to snapinfo objects, such as a snapinfo object 816 comprising information regarding one or more snapshots, such as a pointer to an inofile 818 of a second snapshot of the volume. The inofile 818 comprises cloud block numbers of slots within an object comprising data of the second snapshot, such as a pointer to an indirect 820 that points to data 822 of the snapshot. The inofile 818 may comprise or point to information relating to directories, access control lists, and/or other information.

A mapping metafile (a VMAP) is maintained for the object 808. The mapping metafile maps block numbers of primary storage of the computing device 802 (e.g., virtual volume block numbers of the data stored into slots of the object 808) to cloud block numbers of nodes representing portions of the data stored within the slots of the object 808. The object 808 is stored within the object store 809. In some embodiments of storing objects into the object store 809, the plurality of snapshots 804, maintained by the computing device 802, are stored within objects 810 of the object store 809. Each snapshot is identifiable through a snapinfo object that has a unique generation number. As will be described later, the objects 810 within the object store 809 may be deduplicated with respect to one another (e.g., the object 808 is deduplicated with respect to the object 810 using the mapping metafile as part of being stored into the object store 809) and retain compression used by the computing device 802 for storing the snapshots 804 within the primary storage.

The mapping metafile and/or the data structure are used to provide access through the snapshot file system to portions of data within the slots of the object 808 in the object store 809. In some embodiments, the inode object and the data structure are traversed to identify a sequence number and slot number of requested data. The sequence number and the slot number are used to access the requested data within a corresponding slot of the object 808. In some embodiments, a read request targets a 100,000th level 0 block stored within the object 808. The inode object is read to calculate which blocks in each level of the data structure will have 100,000 (e.g., 100,000/255 is a 493th block in level 1 and 493/255 is a $2^{nd}$ block in level 2). These blocks are read at each level to go to a next level through appropriate pointers (e.g., cloud block numbers) until the data is read from a block of user data within the level 0. The pointers are cloud block numbers, where a pointer comprises a sequence number of the object 808 and a slot number. The sequence number corresponds to an object name of the object 808 and the slot number is which slot the data is located within the object 808.

In an embodiment, an on-demand restore of data within a snapshot stored within objects of the object store 809 can be performed to a target computing device using the mapping metafile and/or the data structure. In an embodiment, the mapping metafile and/or the data structure may be used to free objects from the object store 809 based upon the objects comprising snapshot data of snapshots deleted by the computing device 802.

In an embodiment, the mapping metafile and/or an overflow mapping metafile are used to facilitate the copying of the snapshots to the object store 809 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 804 maintained by the computing device 802 and copied into the objects 810 of the object store 809 as copied snapshots. An entry within the mapping metafile is populated with a mapping between a block number of data within a snapshot at the computing device 802 (e.g., a virtual volume block number) and a cloud block number (e.g., a cloud physical volume block number) of a slot within an object into which the data was copied when the snapshot was copied to the object store 809 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 802 within the primary storage, which are copied to the object store as copied snapshots). In some embodiments, the block numbers may correspond to virtual volume block numbers of data of the snapshots stored by the computing device 802 within the primary storage. In some embodiments, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 802.

The mapping metafile and/or the overflow mapping metafile is used to determine what data of the current snapshot is to be copied to the object store 809 and what data already exists within the object store 809 so that only data not already within the object store 809 is transmitted to the object store 809 for storage within an object. Upon determining that the current snapshot is to be copied to the object store 809, an invalidation phase is performed. In particular, a list of deallocated block numbers of primary storage of the computing device 802 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 809 and a prior copied snapshot already copied from the primary storage to the object store 809 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 809.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In some embodiments, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 809 for storage as a new copied snapshot that is a copy of the current snapshot maintained by the node. The object is stored as a logical copy of the current snapshot. Also, additional compression is applied to this logical data, and information used to decompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 809. Once the object is stored within the object store 809, the mapping metafile and/or the overflow mapping metafile is updated with entries for the deduplicated set of changed block numbers based upon receiving an acknowledgment of the object being stored by the object store 809. An entry will map a changed block number to a cloud block number of a slot within which data of the changed block number is stored in the object.

In an embodiment, the snapshot file system is used to provide various primary storage system services for the object store 809 in order to achieve efficient space and resource management, and flexible scaling in the object store 809 (e.g., a cloud computing environment). Additionally, pseudo read only snapshots are provided through the object store 809. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud storage environment) without changing the meaning or accessibility of useable data in the objects (e.g., a cloud object comprising a snapshot copy of primary data maintained by the computing device 802). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 809, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 802, to the object store 809 such as cloud services within the cloud storage environment.

In one embodiment, objects within the object store 809 (e.g., objects within a cloud computing environment) can be maintained with a read only attribute such that data within objects can be overwritten/modified/freed so long as in-use data within the objects is not altered. In particular, an object may be maintained within the object store 809, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 802 is storing data of a snapshot of a local file system within a slot of an object, and thus the snapshot data is in-use until a particular event occurs such as the computing device 802 deleting the snapshot). In some embodiments, the object comprises snapshot data of a file system, a volume, a logical unit number (LUN), a file, or any other data of the computing device 802. In this way, the object comprises a read only snapshot of data of the computing device 802. In one example, a plurality of objects corresponding to read only snapshots of the file system of the computing device 802 are stored within the object store 809. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 802 (a primary storage system). For example, an in-use slot may be a slot that comprises snapshot data (e.g., secondary/replicated data) of a snapshot created by a computing device 802. The slot becomes an unused slot when the data is no longer actively referenced, used, and/or maintained, such as where the computing device 802 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In some embodiments, the additional data is generated by a cloud service or application executing within the cloud computing environment. This will offload processing and resource utilization that would otherwise be used by the computing device 802 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In some embodiments, a second rule is enforced for the object. The second rule specifies that related read operations are to be directed to a same version of an object. For example, an object corresponds to secondary/replicated snapshot data of a file system maintained by the computing device 802. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In some embodiments, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 809. The objects have a read only state, such that enforcement of the first rule ensures that in-use data within slots of an object is not modifiable, thus making objects pseudo read only objects because only unused slots can be modified/freed of unused data. In some embodiments, an object is used to store data of a snapshot of a file system hosted by the computing device 802. The snapshot may be determined as being deleted by the computing device 802, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In some embodiments, the garbage collection operation is executed by a cloud service in order to conserve resource consumption by the computing device 802 (primary storage system) otherwise used to execute the garbage collection operation. The garbage collection operation free objects from the object store 809 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 809 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 809. However, if the object is not unique to only deleted snapshot(s) such as where the object also stores data of an active/undeleted snapshot, then the object is not freed.

In an embodiment, defragmentation is provided for fragmented objects within the object store 809. In some embodiments, defragmentation is implemented by a cloud service or application executing in the object store 809 in order to conserve resources otherwise used by a computing device 802 (primary storage system) that would execute defragmentation functionality. An object within the object store 809 is determined to be a fragmented object based upon the object comprising at least one freed slot from which data was freed. For example, a freed slot may comprise an unused slot comprising unused data no longer referenced/used by the computing device 802 (e.g., data of a deleted snapshot). Accordingly, the fragmented object may comprise one or more in-use slots of in-use data currently referenced/used by a computing device 802 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 809.

The present system preserves deduplication and compression used by the computing device 802 for snapshots when storing copied snapshots to the object store 809 notwithstanding copied snapshots representing fully logical copies of data in the primary storage of the computing device 802. In particular, deduplication is preserved because data that is shared in a snapshot (e.g., a local or primary snapshot created and maintain by the node) is also shared in a copied snapshot in the object store 809. Deduplication of compression groups is maintained while logically representing the compression groups in a copied snapshot. Block sharing across multiple snapshots is also preserved so that merely changed blocks are transferred/copied to the object store 809 during incremental snapshot transfers.

Additional compression may be provided for a snapshot data copy. In particular, larger compression groups provide more space efficiency but with less read efficiency compared to smaller compression groups. Relatively smaller compression groups may be used by the computing device 802 of the storage system since access to the primary storage of the computing device 802 may be more read intensive, and thus read efficiency is prioritized over storage space efficiency. Because copied snapshots in the object store 809 are infrequently accessed (e.g., cold data that is infrequently read), relatively larger compression groups can be employed for improved storage space efficiency within the object store, which also reduces network bandwidth for snapshot copying to the object store 809.

In one embodiment, snapshots maintained by the computing device 802 are copied to the object store 809 as copied snapshots representing logical data of the snapshots. Data of the copied snapshots is stored into slots of objects that are deduplicated with respect to other objects stored within the object store 809 and retain compression used by the computing device 802 for the snapshots.

In some embodiments, the computing device 802 stores data within primary storage. The computing device 802 may create snapshots of the data stored by the computing device 802. For example, the computing device 802 may create a snapshot of a file, a logical unit number, a directory, a volume, a storage virtual machine hosting a plurality of volumes, a file system, a consistency group of any arbitrary grouping of files, directories, or data, etc. The computing device 802 may deduplicate data between the snapshots so that instead of storing redundant data blocks multiple times, merely references are stored in place of the redundant data blocks and point to original data blocks with the same data. The computing device 802 may compress data within the snapshots, such as by creating compression groups of compressed data blocks.

The mapping metafile and/or the overflow mapping metafile is used to determine what data of the current snapshot is to be copied to the object store 809 and what data already exists within the object store so that only data not already within the object store is transmitted to the object store 809 for storage within an object. Upon determining that the current snapshot is to be copied to the object store, an invalidation phase is performed. In particular, a list of deallocated block numbers of primary storage of the computing device 802 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

Figure 9:
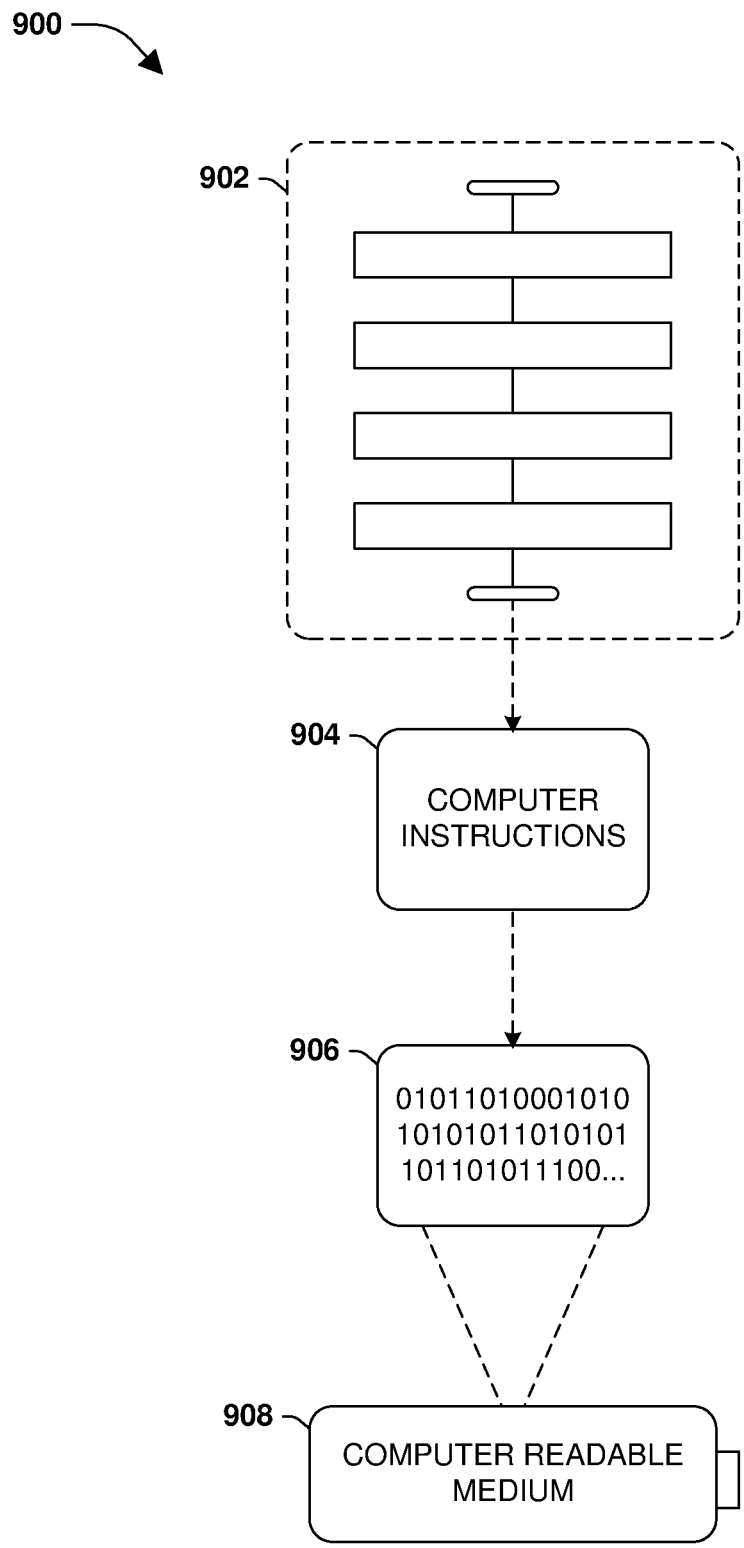
FIG. 9 is an example of a computer readable medium in which an embodiment of the present technology may be implemented.

Still another embodiment involves a computer-readable medium 900 comprising processor-executable instructions configured to implement one or more of the techniques presented herein. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the exemplary method 100 of FIG. 1, at least some of the exemplary method 300 of FIG. 3, and/or at least some of the exemplary method 500 of FIG. 5, for example. In some embodiments, the processor-executable computer instructions 904 are configured to implement a system, such as at least some of the exemplary system 200 of FIGS. 2A-2E and/or at least some of the exemplary system 400 of FIGS. 4A-4D, and/or at least some of the exemplary system 600 of FIGS. 6A and 6B, for example. Many such computer-readable media are contemplated to operate in accordance with the techniques presented herein.

Figure 10:
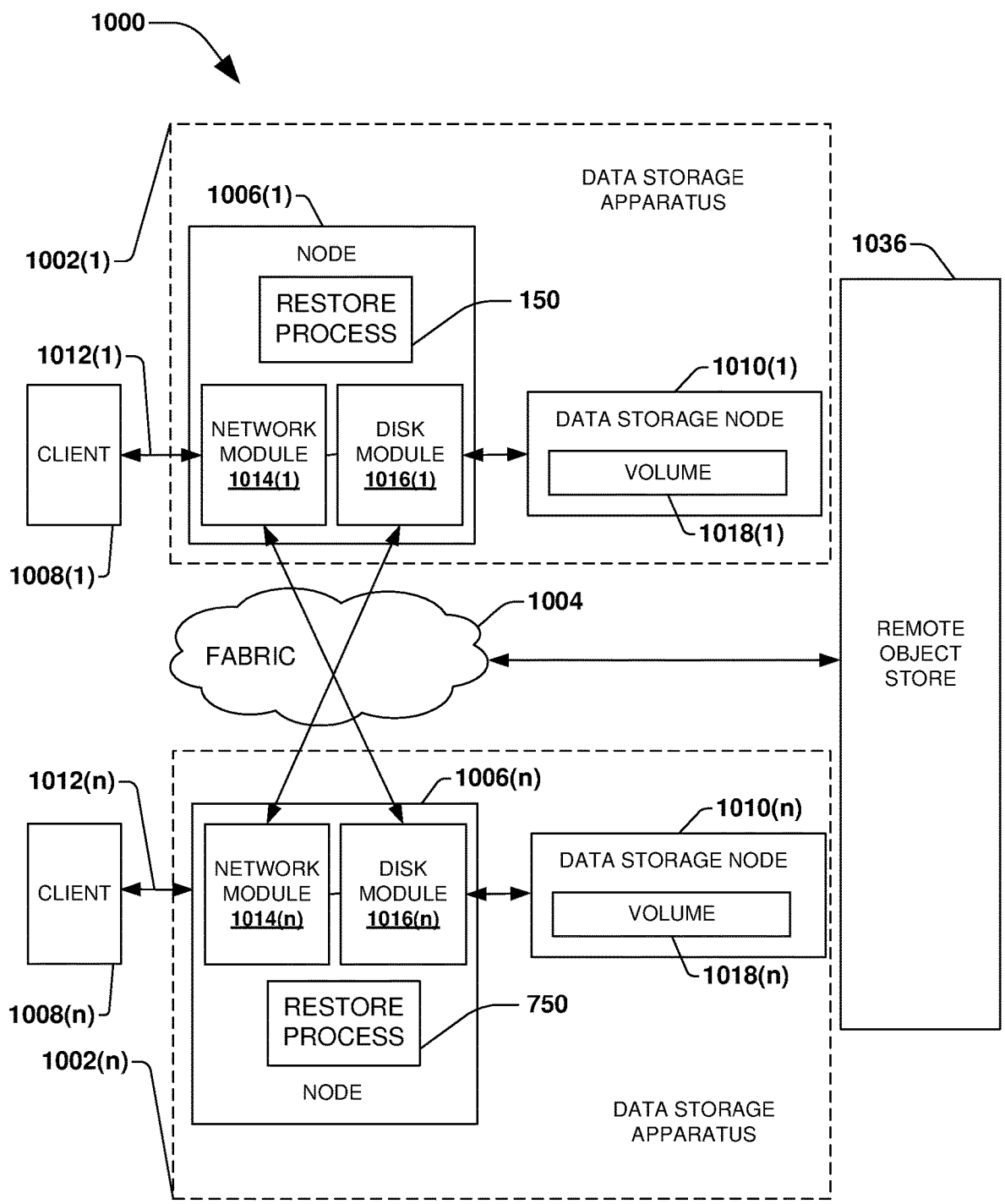
FIG. 10 is a block diagram illustrating a network environment with exemplary nodes.

A clustered network environment 1000 that may implement one or more aspects of the techniques described and illustrated herein is shown in FIG. 10. The clustered network environment 1000 includes data storage apparatuses 1002(1)-1002(n) that are coupled over a cluster or cluster fabric 1004 that includes one or more communication network(s) and facilitates communication between the data storage apparatuses 1002(1)-1002(n) (and one or more modules, components, etc. therein, such as, computing devices 1006(1)-1006(n), for example), although any number of other elements or components can also be included in the clustered network environment 1000 in other examples.

In some embodiments, the nodes 1006(1)-1006(n) may be configured to implement the techniques described herein. The nodes 1006(1)-1006(n) may host the restore process 150 that is configured to perform a directory and/or other techniques described herein.

In this example, computing devices 1006(1)-1006(n) can be primary or local storage controllers or secondary or remote storage controllers that provide client devices 1008(1)-1008(n) with access to data stored within data storage devices 1010(1)-1010(n) and storage devices of a remote object store 1036. The computing devices 1006(1)-1006(n) may be implemented as hardware, software (e.g., a storage virtual machine), or combination thereof. The computing devices 1006(1)-1006(n) may be used to host containers of a container orchestration platform.

The data storage apparatuses 1002(1)-1002(n) and/or computing devices 1006(1)-1006(n) of the examples described and illustrated herein are not limited to any particular geographic areas and can be clustered locally and/or remotely via a cloud network, or not clustered in other examples. Thus, in one example the data storage apparatuses 1002(1)-1002(n) and/or computing device computing device 1006(1)-1006(n) can be distributed over a plurality of storage systems located in a plurality of geographic locations (e.g., located on-prem, located within a cloud computing environment, etc.); while in another example a clustered network can include data storage apparatuses 1002(1)-1002(n) and/or computing device computing device 1006(1)-1006(n) residing in a same geographic location (e.g., in a single on-site rack).

In the illustrated example, one or more of the client devices 1008(1)-1008(n), which may be, for example, personal computers (PCs), computing devices used for storage (e.g., storage servers), or other computers or peripheral devices, are coupled to the respective data storage apparatuses 1002(1)-1002(n) by network connections 1012(1)-1012(n). Network connections 1012(1)-1012(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 1008(1)-1008(n) may be general-purpose computers running applications and may interact with the data storage apparatuses 1002(1)-1002(n) using a client/server model for exchange of information. That is, the client devices 1008(1)-1008(n) may request data from the data storage apparatuses 1002(1)-1002(n) (e.g., data on one of the data storage devices 1010(1)-1010(n) managed by a network storage controller configured to process I/O commands issued by the client devices 1008(1)-1008(n)), and the data storage apparatuses 1002(1)-1002(n) may return results of the request to the client devices 1008(1)-1008(n) via the network connections 1012(1)-1012(n).

The computing devices 1006(1)-1006(n) of the data storage apparatuses 1002(1)-1002(n) can include network or host computing devices that are interconnected as a cluster to provide data storage and management services, such as to an enterprise having remote locations, cloud storage (e.g., a storage endpoint may be stored within storage devices of the remote object store 1036), etc., for example. Such computing devices 1006(1)-1006(n) can be attached to the cluster fabric 1004 at a connection point, redistribution point, or communication endpoint, for example. One or more of the computing devices 1006(1)-1006(n) may be capable of sending, receiving, and/or forwarding information over a network communications channel, and could comprise any type of device that meets any or all of these criteria.

In an embodiment, the computing devices 1006(1) and 1006(n) may be configured according to a disaster recovery configuration whereby a surviving computing device provides switchover access to the data storage devices 1010(1)-1010(n) in the event a disaster occurs at a disaster storage site (e.g., the computing device computing device 1006(1) provides client device 1012(n) with switchover data access to data storage devices 1010(n) in the event a disaster occurs at the second storage site). In other examples, the computing device computing device 1006(n) can be configured according to an archival configuration and/or the computing devices 1006(1)-1006(n) can be configured based on another type of replication arrangement (e.g., to facilitate load sharing). Additionally, while two computing devices are illustrated in FIG. 10, any number of computing devices or data storage apparatuses can be included in other examples in other types of configurations or arrangements.

As illustrated in the clustered network environment 1000, computing devices 1006(1)-1006(n) can include various functional components that coordinate to provide a distributed storage architecture. For example, the computing devices 1006(1)-1006(n) can include network modules 1014(1)-1014(n) and disk modules 1016(1)-1016(n). Network modules 1014(1)-1014(n) can be configured to allow the computing devices 1006(1)-1006(n) (e.g., network storage controllers) to connect with client devices 1008(1)-1008(n) over the storage network connections 1012(1)-1012(n), for example, allowing the client devices 1008(1)-1008(n) to access data stored in the clustered network environment 1000.

Further, the network modules 1014(1)-1014(n) can provide connections with one or more other components through the cluster fabric 1004. For example, the network module 1014(1) of computing device computing device 1006(1) can access the data storage device 1010(n) by sending a request via the cluster fabric 1004 through the disk module 1016(n) of computing device computing device 1006(n) when the computing device computing device 1006(n) is available. Alternatively, when the computing device computing device 1006(n) fails, the network module 1014(1) of computing device computing device 1006(1) can access the data storage device 1010(n) directly via the cluster fabric 1004. The cluster fabric 1004 can include one or more local and/or wide area computing networks (i.e., cloud networks) embodied as Infiniband, Fibre Channel (FC), or Ethernet networks, for example, although other types of networks supporting other protocols can also be used.

Disk modules 1016(1)-1016(n) can be configured to connect data storage devices 1010(1)-1010(n), such as disks or arrays of disks, SSDs, flash memory, or some other form of data storage, to the computing devices 1006(1)-1006(n). Often, disk modules 1016(1)-1016(n) communicate with the data storage devices 1010(1)-1010(n) according to the SAN protocol, such as iSCSI or FCP, for example, although other protocols can also be used. Thus, as seen from an operating system on computing devices 1006(1)-1006(n), the data storage devices 1010(1)-1010(n) can appear as locally attached. In this manner, different computing devices 1006(1)-1006(n), etc. may access data blocks, files, or objects through the operating system, rather than expressly requesting abstract files.

While the clustered network environment 1000 illustrates an equal number of network modules 1014(1)-1014(n) and disk modules 1016(1)-1016(n), other examples may include a differing number of these modules. For example, there may be a plurality of network and disk modules interconnected in a cluster that do not have a one-to-one correspondence between the network and disk modules. That is, different computing devices can have a different number of network and disk modules, and the same computing device computing device can have a different number of network modules than disk modules.

Further, one or more of the client devices 1008(1)-1008(n) can be networked with the computing devices 1006(1)-1006(n) in the cluster, over the storage connections 1012(1)-1012(n). As an example, respective client devices 1008(1)-1008(n) that are networked to a cluster may request services (e.g., exchanging of information in the form of data packets) of computing devices 1006(1)-1006(n) in the cluster, and the computing devices 1006(1)-1006(n) can return results of the requested services to the client devices 1008(1)-1008(n). In one example, the client devices 1008(1)-1008(n) can exchange information with the network modules 1014(1)-1014(n) residing in the computing devices 1006(1)-1006(n) (e.g., network hosts) in the data storage apparatuses 1002(1)-1002(n).

In one example, the storage apparatuses 1002(1)-1002(n) host aggregates corresponding to physical local and remote data storage devices, such as local flash or disk storage in the data storage devices 1010(1)-1010(n), for example. One or more of the data storage devices 1010(1)-1010(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 1018(1)-1018(n) in this example, although any number of volumes can be included in the aggregates. The volumes 1018(1)-1018(n) are virtual data stores or storage objects that define an arrangement of storage and one or more file systems within the clustered network environment 1000. Volumes 1018(1)-1018(n) can span a portion of a disk or other storage device, a collection of disks, or portions of disks, for example, and typically define an overall logical arrangement of data storage. In one example, volumes 1018(1)-1018(n) can include stored user data as one or more files, blocks, or objects that may reside in a hierarchical directory structure within the volumes 1018(1)-1018(n).

Volumes 1018(1)-1018(n) are typically configured in formats that may be associated with particular storage systems, and respective volume formats typically comprise features that provide functionality to the volumes 1018(1)-1018(n), such as providing the ability for volumes 1018(1)-1018(n) to form clusters, among other functionality. Optionally, one or more of the volumes 1018(1)-1018(n) can be in composite aggregates and can extend between one or more of the data storage devices 1010(1)-1010(n) and one or more of the storage devices of the remote object store 1036 to provide tiered storage, for example, and other arrangements can also be used in other examples.

In one example, to facilitate access to data stored on the disks or other structures of the data storage devices 1010(1)-1010(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 1010(1)-1010(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 1010(1)-1010(n) can have one or more physical ports, wherein each physical port can be assigned a target address (e.g., iSCSI target address). To represent respective volumes, a target address on the data storage devices 1010(1)-1010(n) can be used to identify one or more of the LUNs. Thus, for example, when one of the computing devices 1006(1)-1006(n) connects to a volume, a connection between the one of the computing devices 1006(1)-1006(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 11:
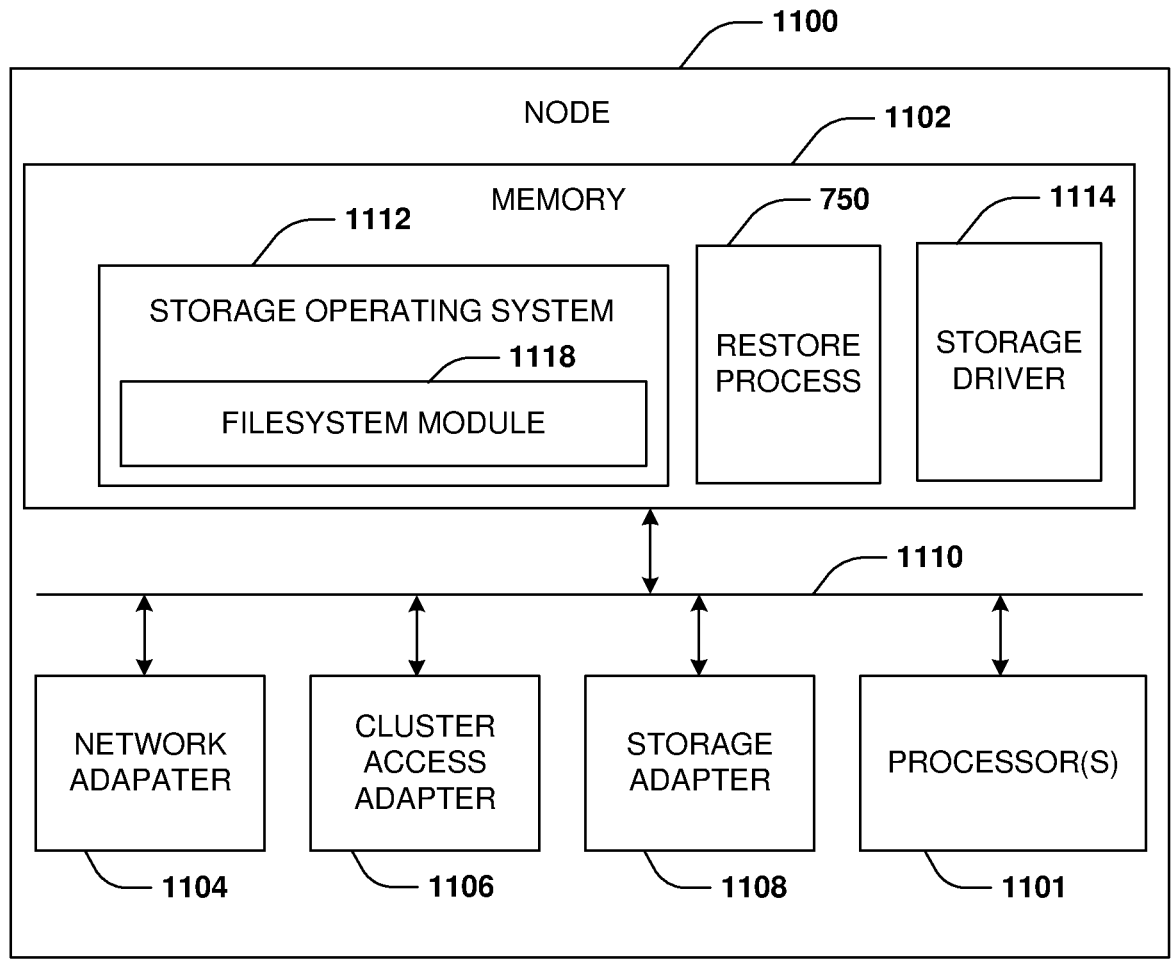
FIG. 11 is a block diagram illustrating an exemplary node.

Referring to FIG. 11, a node 1100 in this particular example includes processor(s) 1101, a memory 1102, a network adapter 1104, a cluster access adapter 1106, and a storage adapter 1108 interconnected by a system bus 1110. In other examples, the node 1100 comprises a virtual machine, such as a virtual storage machine.

In some embodiments, programming code of the restore process 750 may be stored within the memory 1102 of the node 1100 and may be executed by the processors(s) 1101 to perform directory restore other techniques described herein.

The network adapter 1104 in this example includes the mechanical, electrical and signaling circuitry needed to connect the node 1100 to one or more of the client devices over network connections, which may comprise, among other things, a point-to-point connection or a shared medium, such as a local area network. In some examples, the network adapter 1104 further communicates (e.g., using TCP/IP) via a cluster fabric and/or another network (e.g., a WAN) (not shown) with storage devices of a distributed storage system to process storage operations associated with data stored thereon.

The storage adapter 1108 cooperates with the storage operating system 1112 executing on the node 1100 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 1108 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 1108 and, if necessary, processed by the processor(s) 1101 (or the storage adapter 1108 itself) prior to being forwarded over the system bus 1110 to the network adapter 1104 (and/or the cluster access adapter 1106 if sending to another node in the cluster) where the information is formatted into a data packet and returned to a requesting one of the client devices and/or sent to another node attached via a cluster fabric. In some examples, a storage driver 1114 in the memory 1102 interfaces with the storage adapter to facilitate interactions with the data storage devices.

The storage operating system 1112 can also manage communications for the node 1100 among other devices that may be in a clustered network, such as attached to the cluster fabric. Thus, the node 1100 can respond to client device requests to manage data on one of the data storage devices or storage devices of the distributed storage system in accordance with the client device requests.

The file system module 1118 of the storage operating system 1112 can establish and manage one or more file systems including software code and data structures that implement a persistent hierarchical namespace of files and directories, for example. As an example, when a new data storage device (not shown) is added to a clustered network system, the file system module 1118 is informed where, in an existing directory tree, new files associated with the new data storage device are to be stored. This is often referred to as "mounting" a file system.

In the example node 1100, memory 1102 can include storage locations that are addressable by the processor(s) 1101 and adapters 1104, 1106, and 1108 for storing related software application code and data structures. The processor(s) 1101 and adapters 1104, 1106, and 1108 may, for example, include processing elements and/or logic circuitry configured to execute the software code and manipulate the data structures.

The storage operating system 1112, portions of which are typically resident in the memory 1102 and executed by the processor(s) 1101, invokes storage operations in support of a file service implemented by the node 1100. Other processing and memory mechanisms, including various computer readable media, may be used for storing and/or executing application instructions pertaining to the techniques described and illustrated herein. In this particular embodiment, the node 1100 also includes a module configured to implement the techniques described herein, as discussed above.

The examples of the technology described and illustrated herein may be embodied as one or more non-transitory computer or machine readable media, such as the memory 1102, having machine or processor-executable instructions stored thereon for one or more aspects of the present technology, which when executed by processor(s), such as processor(s) 1101, cause the processor(s) to carry out the steps necessary to implement the methods of this technology, as described and illustrated with the examples herein. In some examples, the executable instructions are configured to perform one or more steps of a method described and illustrated later.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
generating a mapping that tracks a set of objects comprising snapshot data of a snapshot for content items in a directory to restore by a restore process as a restore directory;
transmitting a command to an object store to restore a subset of the set of objects from an archival storage tier to a storage tier of the object store;
reissuing the restore process to restore the content items by:
populating a checkpoint structure with an indication content items already successfully restored;
retrieving, utilizing the checkpoint structure, the snapshot data of the content items being restored; and
utilizing the snapshot data to restore the content items as restored content items in the restore directory; and
in response to the restore process failing based upon the object store returning an invalid object state for an object of the set of objects, triggering an evaluation of the mapping to identify the subset of the set of objects to restore from the archival storage tier to the storage tier.

2. The method of claim 1, comprising:
restoring, prior to performing the restore process, access information for the directory from the object store to the restore directory for providing access to restored content items of the directory during the restore process.

3. The method of claim 1, comprising:
restoring, prior to performing the restore process, access information comprising access control lists;
applying the access control lists to the restore directory; and
utilizing the access control lists to authenticate access requests to the restored content items in the restore directory during the restore process.

4. The method of claim 1, comprising:
restoring, prior to performing the restore process, access information comprising streams;
applying the streams to the restore directory; and
utilizing the streams to provide access to the restored content items in the restore directory during the restore process.

5. The method of claim 1, comprising:
preserving links, within the directory, to files in the directory as preserved links in the restore directory, wherein the preserved links link to restored content items in the restore directory.

6. The method of claim 1, comprising:
identifying a link in the directory that links to an external content item not located within the directory;
retrieving the external content item from the object store; and
restoring the external content item into the restore directory as a restored external content item used to replace the link.

7. The method of claim 1, comprising:
providing non-fenced access to the restore directory during the restore process.

8. The method of claim 1, comprising:
for a batch of content items currently being restored, setting a fence to block access to the content items until an entirety of the batch of the content items has successfully been restored; and
providing non-fenced access to previously restored content items restored to the restore directory by previously processed batches of content items.

9. The method of claim 8, comprising:
in response to successfully creating the restored content items corresponding to the batch of the content items, updating the checkpoint structure with a new indication the batch of the content items have been successfully restored.

10. The method of claim 1, comprising:
in response to a content item, being restored, corresponding to a subdirectory of the directory, recursively identifying and restoring content items in the subdirectory to the restore directory.

11. The method of claim 1, comprising:
in response to detecting a current directory with a same name as the directory to be restored, generating an alert to a user to either delete or rename the current directory.

12. The method of claim 1, comprising:
in response to encountering a qtree within the directory, restoring the qtree as a restored qtree using snapshot data from the set of objects in the object store.

13. The method of claim 1, comprising:
in response to the restore process failing, using the checkpoint structure to restart the restore process to process a batch of the content items where the restore process left off.

14. The method of claim 1, comprising:
in response to the restore processing failing, performing a cleanup procedure for restored content items and the restore directory.

15. A computing device comprising:
a memory comprising machine executable code; and
a processor coupled to the memory, the processor configured to execute the machine executable code to cause the computing device to:
generate a mapping that tracks a set of objects comprising snapshot data of a snapshot for content items in a directory to restore by a restore process as a restore directory;
transmit a command to an object store to restore a subset of the set of objects from an archival storage tier to a storage tier of the object store;
reissue the restore process to restore the content items by:
populating a checkpoint structure with an indication content items already successfully restored;
retrieving, utilizing the checkpoint structure, the snapshot data of the content items being restored; and
utilizing the snapshot data to restore the content items as restored content items in the restore directory; and
in response to the restore process failing based upon the object store returning an invalid object state for an object of the set of objects, trigger an evaluation of the mapping to identify the subset of the set of objects to restore from the archival storage tier to the storage tier.

16. The computing device of claim 15, wherein the machine execute code causes the computing device to:
generate the checkpoint structure with information used to track progress of the restore process.

17. A non-transitory machine readable medium comprising instructions for performing a method, which when executed by a machine, causes the machine to:
generate a mapping that tracks a set of objects comprising snapshot data of a snapshot for content items in a directory to restore by a restore process as a restore directory;
transmit a command to an object store to restore a subset of the set of objects from an archival storage tier to a storage tier of the object store;
reissue the restore process to restore the content items by:
populating a checkpoint structure with an indication content items already successfully restored;
retrieving, utilizing the checkpoint structure, the snapshot data of the content items being restored; and
utilizing the snapshot data to restore the content items as restored content items in the restore directory; and
in response to the restore process failing based upon the object store returning an invalid object state for an object of the set of objects, trigger an evaluation of the mapping to identify the subset of the set of objects to restore from the archival storage tier to the storage tier.

18. The non-transitory machine readable medium of claim 17, wherein the instructions cause the machine to:
transfer metadata of the snapshot from the object store to the restore directory.

19. The non-transitory machine readable medium of claim 17, wherein the instructions cause the machine to:
    restore and apply access permissions to the restore directory.

20. The non-transitory machine readable medium of claim 17, wherein the instructions cause the machine to:
    set file modify times of files within the restore directory to file modify times specified within the snapshot for the files.

\* \* \* \* \*